US012631467B2

(12) United States Patent
Yoshida et al.

(10) Patent No.: US 12,631,467 B2
(45) Date of Patent: May 19, 2026

(54) VIRTUAL MAP PROVIDING DEVICE

(71) Applicant: Mitsubishi Electric Corporation, Tokyo (JP)

(72) Inventors: Mitsunobu Yoshida, Tokyo (JP); Toshiki Kawase, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 309 days.

(21) Appl. No.: 18/020,438

(22) PCT Filed: Aug. 21, 2020

(86) PCT No.: PCT/JP2020/031637
§ 371 (c)(1),
(2) Date: Feb. 9, 2023

(87) PCT Pub. No.: WO2022/038772
PCT Pub. Date: Feb. 24, 2022

(65) Prior Publication Data
US 2023/0304824 A1 Sep. 28, 2023

(51) Int. Cl.
G01C 21/00 (2006.01)
G01C 21/36 (2006.01)

(52) U.S. Cl.
CPC ......... G01C 21/38 (2020.08); G01C 21/3667 (2013.01); G01C 21/3691 (2013.01)

(58) Field of Classification Search
None
See application file for complete search history.

(56) References Cited

U.S. PATENT DOCUMENTS

| | | | |
|---|---|---|---|
| 6,223,125 | B1 | 4/2001 | Hall |
| RE38,870 | E | 11/2005 | Hall |
| 8,634,980 | B1 | 1/2014 | Urmson et al. |
| 8,688,306 | B1 | 4/2014 | Nemec et al. |
| 8,965,621 | B1 | 2/2015 | Urmson et al. |
| 9,120,484 | B1 | 9/2015 | Ferguson et al. |

(Continued)

FOREIGN PATENT DOCUMENTS

| | | |
|---|---|---|
| JP | 3217464 B2 | 10/2001 |
| JP | 2002-541536 A | 12/2002 |

(Continued)

OTHER PUBLICATIONS

US Department of Transportation, FHA, "2009 Manual on Uniform Traffic Control Devices, part6: temporary traffic control", US Department of Transportation, FHA, pp. 549-732 (Year: 2009).*

(Continued)

*Primary Examiner* — Hongye Liang
(74) *Attorney, Agent, or Firm* — XSENSUS LLP

(57) ABSTRACT

A virtual map providing device (100) dynamically changes, with respect to a driveway (201) on which one or more inbound vehicles (210) moving in an inbound direction and one or more outbound vehicles (210) moving in an outbound direction are to move, an inbound zone on which the one or more inbound vehicles are to move, and an outbound zone on which the one or more outbound vehicles are to move. Then, the virtual map providing device delivers change information data including information of a post-change inbound zone and information of a post-change outbound zone.

13 Claims, 17 Drawing Sheets

(56) References Cited

U.S. PATENT DOCUMENTS

| | | | |
|---|---|---|---|
| 9,122,948 B1 | 9/2015 | Zhu et al. | |
| 9,658,620 B1 | 5/2017 | Urmson et al. | |
| 9,679,191 B1 | 6/2017 | Zhu et al. | |
| 9,911,030 B1 | 3/2018 | Zhu et al. | |
| 10,198,619 B1 | 2/2019 | Zhu et al. | |
| 10,372,129 B1 | 8/2019 | Urmson et al. | |
| 10,572,717 B1 | 2/2020 | Zhu et al. | |
| 11,010,998 B1 | 5/2021 | Dolgov et al. | |
| 11,106,893 B1 | 8/2021 | Zhu et al. | |
| 11,287,817 B1 | 3/2022 | Urmson et al. | |
| 2010/0019932 A1 | 1/2010 | Goodwin | |
| 2011/0022201 A1 | 1/2011 | Reumerman et al. | |
| 2012/0083959 A1 | 4/2012 | Dolgov et al. | |
| 2012/0083960 A1 | 4/2012 | Zhu et al. | |
| 2012/0083964 A1 | 4/2012 | Montemerlo et al. | |
| 2012/0229301 A1 | 9/2012 | Goodwin | |
| 2013/0297140 A1 | 11/2013 | Montemerlo et al. | |
| 2014/0136045 A1 | 5/2014 | Zhu et al. | |
| 2014/0324268 A1 | 10/2014 | Montemerlo et al. | |
| 2015/0199619 A1 | 7/2015 | Ichinose et al. | |
| 2016/0012726 A1 | 1/2016 | Wang | |
| 2016/0155332 A1 | 6/2016 | Wang | |
| 2016/0232785 A1 | 8/2016 | Wang | |
| 2017/0098376 A1 | 4/2017 | Wang | |
| 2017/0225567 A1 | 8/2017 | Tsuda | |
| 2017/0227966 A1 | 8/2017 | Monzen et al. | |
| 2017/0305420 A1 | 10/2017 | Desens et al. | |
| 2017/0309170 A1 | 10/2017 | Wang | |
| 2018/0165954 A1* | 6/2018 | Song | G08G 1/056 |
| 2018/0174446 A1 | 6/2018 | Wang | |
| 2018/0232958 A1 | 8/2018 | Wang | |
| 2018/0247528 A1* | 8/2018 | Dey | G08G 1/0145 |
| 2018/0276700 A1 | 9/2018 | Wang | |
| 2018/0283897 A1 | 10/2018 | Wang | |
| 2018/0299284 A1 | 10/2018 | Wang | |
| 2018/0357900 A1 | 12/2018 | Wang | |
| 2019/0072976 A1 | 3/2019 | Bell et al. | |
| 2019/0078897 A1 | 3/2019 | Sumizawa | |
| 2019/0111784 A1 | 4/2019 | Tsuda | |
| 2019/0172272 A1 | 6/2019 | Wang | |
| 2019/0205911 A1 | 7/2019 | Wang | |
| 2019/0248439 A1 | 8/2019 | Wang | |
| 2019/0263281 A1 | 8/2019 | Wang | |
| 2019/0361431 A1* | 11/2019 | Choi | G06F 3/015 |
| 2020/0090204 A1 | 3/2020 | Wang | |
| 2020/0150655 A1 | 5/2020 | Artes et al. | |

| | | | |
|---|---|---|---|
| 2021/0165417 A1 | 6/2021 | Bell et al. | |
| 2021/0180987 A1 | 6/2021 | Terada | |
| 2021/0192560 A1 | 6/2021 | Wang | |

FOREIGN PATENT DOCUMENTS

| | | | |
|---|---|---|---|
| JP | 2004-234320 A | 8/2004 | |
| JP | 2007-122578 A | 5/2007 | |
| JP | 2007-272647 A | 10/2007 | |
| JP | 2008-59323 A | 3/2008 | |
| JP | 2010-221806 A | 10/2010 | |
| JP | 2011-516956 A | 5/2011 | |
| JP | 2011-529226 A | 12/2011 | |
| JP | 2013-544695 A | 12/2013 | |
| JP | 2014-225151 A | 12/2014 | |
| JP | 2015-207129 A | 11/2015 | |
| JP | 2015-225025 A | 12/2015 | |
| JP | 2017-142145 A | 8/2017 | |
| JP | 2017-142223 A | 8/2017 | |
| JP | 2017-530045 A | 10/2017 | |
| JP | 2018-503204 A | 2/2018 | |
| JP | 2018-32433 A | 3/2018 | |
| JP | 2018-106255 A | 7/2018 | |
| JP | 2018-197758 A | 12/2018 | |
| JP | 2019-67368 A | 4/2019 | |
| JP | 2019-79239 A | 5/2019 | |
| JP | 2019-513198 A | 5/2019 | |
| JP | 2019-87037 A | 6/2019 | |
| JP | 2019-527160 A | 9/2019 | |
| JP | 6651221 B1 | 2/2020 | |
| JP | 2020-35228 A | 3/2020 | |
| JP | 2020-509500 A | 3/2020 | |
| WO | 2012/047743 A2 | 4/2012 | |
| WO | 2012/086301 A1 | 6/2012 | |
| WO | 2014/024254 A1 | 2/2014 | |
| WO | 2017/065182 A1 | 4/2017 | |
| WO | 2019/012612 A1 | 1/2019 | |
| WO | 2020/045324 A1 | 3/2020 | |

OTHER PUBLICATIONS

Japanese Office Action issued May 30, 2023 in corresponding Japanese Patent Application No. 2022-543245 (with machine-generated English translation), 5 pages.
International Search Report and Written Opinion mailed on Nov. 2, 2020, received for PCT Application PCT/JP2020/031637, filed on Aug. 21, 2020, 9 pages including English Translation.

* cited by examiner

VEHICLE ZONE INFORMATION

300:VIRTUAL MAP PROVIDING SYSTEM

100
VIRTUAL MAP
PROVIDING DEVICE

302.BASE STATION

304:MOBILE TERMINAL

303:PEDESTRIAN

310:PMV

304

303

301:SIDEWALK

VIRTUAL MAP PROVIDING DEVICE

CROSS-REFERENCE TO RELATED APPLICATION

The present application is based on PCT filing PCT/JP2020/031637, filed Aug. 21, 2020, the entire contents of which are incorporated herein by reference.

TECHNICAL FIELD

The present disclosure relates to a system for providing virtual map data including information of a virtual lane, and so on to a mobile body such as a vehicle.

BACKGROUND ART

Researches on techniques for setting virtual lanes with respect to a driveway and controlling a vehicle on a basis of information of the virtual lanes have been made, and development of such techniques is underway.

Patent Literature 1 discloses changing a number of virtual lanes depending on a timeframe.

Specifically, Patent Literature 1 discloses setting four virtual lanes with respect to a one-way road for daytime hours where a traffic volume is large, and setting three virtual lanes for nighttime hours where the traffic volume is small.

CITATION LIST

Patent Literature

Patent Literature 1: WO2017/065182

SUMMARY OF INVENTION

Technical Problem

With the technique of Patent Literature 1, only the number of virtual lanes on a one-way road is changed. Therefore, if a number of vehicles moving in an inbound direction and a number of vehicles moving in an outbound direction are completely different, the entire road cannot be fully utilized effectively. For example, if the number of vehicles moving in the inbound direction is larger than the number of vehicles moving in the outbound direction, a situation arises where a less crowded virtual lane exists on the road in the outbound direction, despite that all virtual lanes are jammed on the road in the inbound direction.

An objective of the present disclosure is to enable fully effective use of the entire road.

Solution to Problem

A virtual map providing device according to the present disclosure includes:

a zone setting unit to dynamically change, with respect to a driveway on which one or more inbound vehicles moving in an inbound direction and one or more outbound vehicles moving in an outbound direction are to move, an inbound zone on which the one or more inbound vehicles are to move, and an outbound zone on which the one or more outbound vehicles are to move; and a virtual information delivery unit to deliver change information data including information of a post-change inbound zone and information of a post-change outbound zone.

Advantageous Effects of Invention

According to the present disclosure, it is possible to make fully effective use of an entire road.

DESCRIPTION OF EMBODIMENTS

Figure 1:
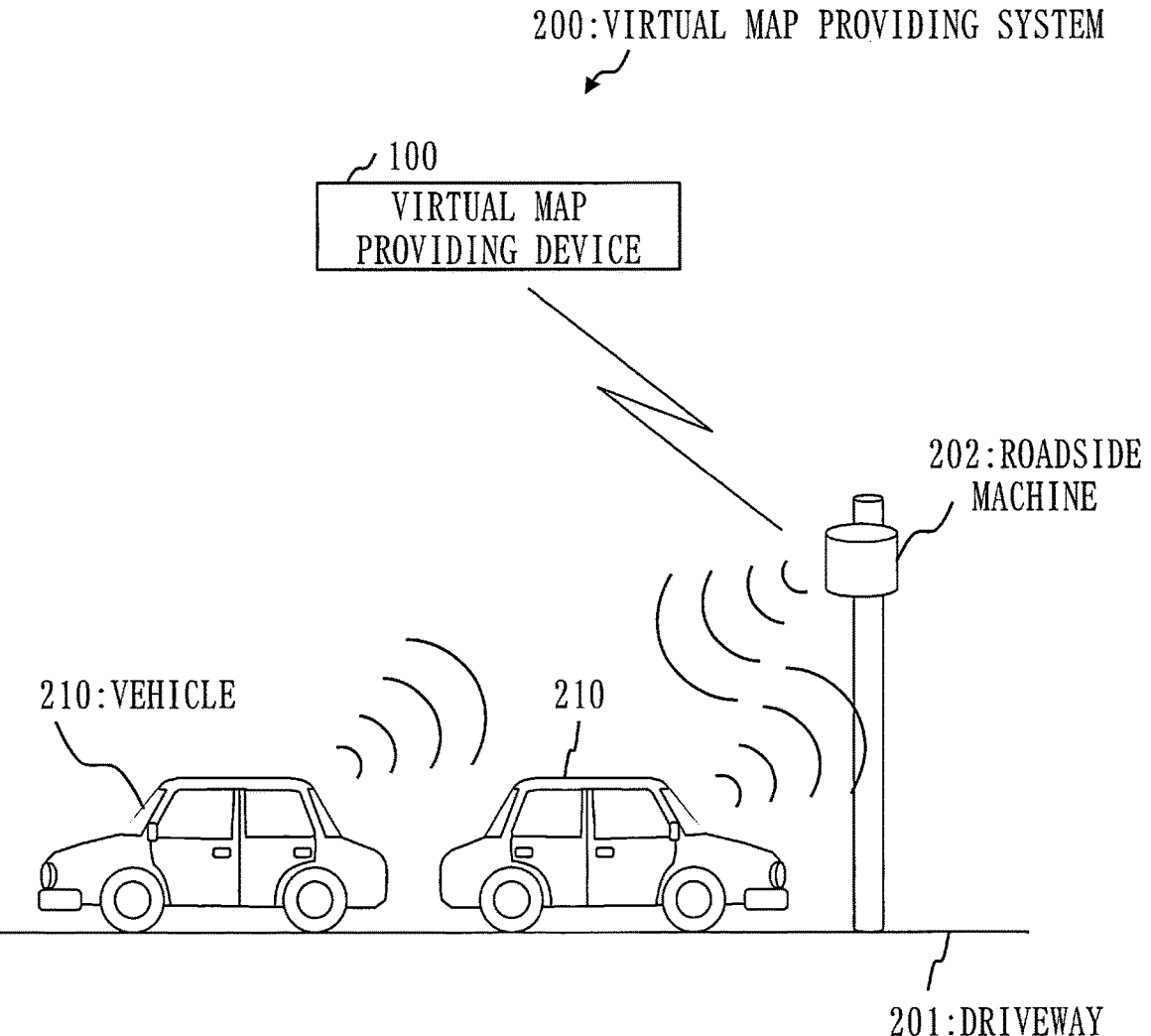
FIG. 1 is a configuration diagram of a virtual map providing system 200 in Embodiment 1.

In embodiments and drawings, the same element or the equivalent elements are denoted by the same reference sign. Description of an element denoted by the same reference sign as that of a described element will appropriately be omitted or simplified. Arrows in the drawings mainly illustrate data flows or process flows.

Embodiment 1

A virtual map providing system 200 will be described with referring to FIGS. 1 to 10.
*Description of Configurations*
A configuration of the virtual map providing system 200 will be described with referring to FIG. 1.

The virtual map providing system 200 is a system to deliver virtual map data to one or more vehicles 210.

The virtual map providing system 200 is equipped with a virtual map providing device 100. For example, the virtual map providing device 100 is installed in a traffic control center.

The virtual map providing device 100 delivers the virtual map data to the one or more vehicles 210. For example, the virtual map providing device 100 delivers the virtual map data via a roadside machine 202.

The vehicle 210 travels on a driveway 201 with utilizing the virtual map data.

The driveway 201 is a road on which one or more inbound vehicles and one or more outbound vehicles are to move. An inbound vehicle is a vehicle 210 moving in an inbound direction. An outbound vehicle is a vehicle 210 moving in an outbound direction.

The vehicle 210 communicates with the virtual map providing device 100.

For example, the vehicle 210 receives the virtual map data from the virtual map providing device 100 via the roadside machine 202.

For example, the vehicle 210 transmits peripheral information data to the virtual map providing device 100 via the roadside machine 202. The peripheral information data expresses information of another vehicle traveling on a periphery of the vehicle 210, and so on.

Figure 2:
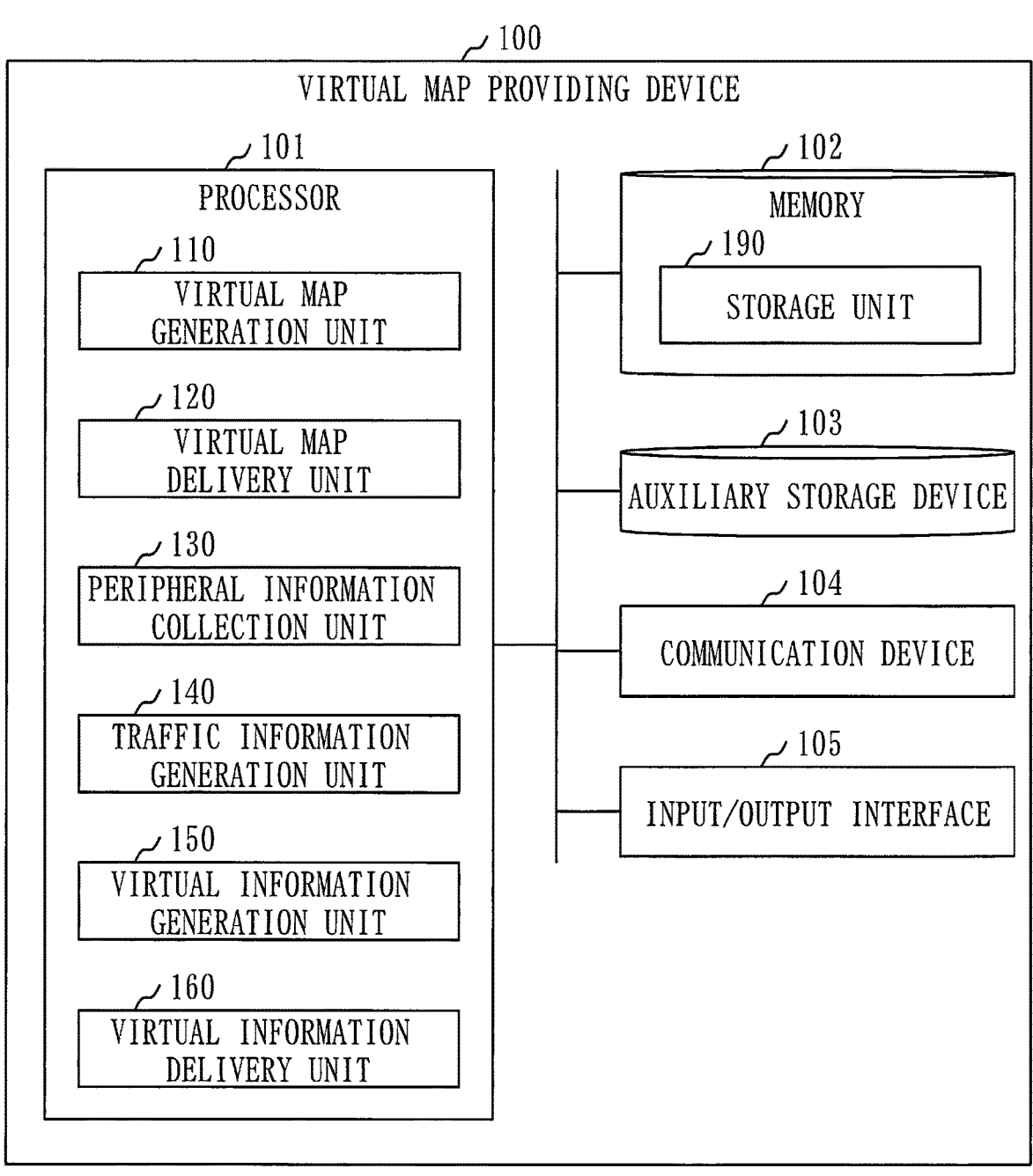
FIG. 2 is a configuration diagram of a virtual map providing device 100 in Embodiment 1.

A configuration of the virtual map providing device 100 will be described with referring to FIG. 2.

The virtual map providing device 100 is a computer provided with hardware devices such as a processor 101, a memory 102, an auxiliary storage device 103, a communication device 104, and an input/output interface 105. These hardware devices are connected to each other via a signal line.

The processor 101 is an IC to perform computation processing and controls the other hardware devices. For example, the processor 101 is a CPU, a DSP, or a GPU.

Note that IC stands for Integrated Circuit.

Note that CPU stands for Central Processing Unit.

Note that DSP stands for Central Signal Processor.

Note that GPU stands for Graphics Processing Unit.

The memory 102 is a volatile or non-volatile storage device. The memory 102 is also called a main storage device or a main memory. For example, the memory 102 is a RAM. Data stored in the memory 102 is saved in the auxiliary storage device 103 as necessary.

Note that RAM stands for Random-Access Memory.

The auxiliary storage device 103 is a non-volatile storage device. For example, the auxiliary storage device 103 is a ROM, an HDD, or a flash memory. Data stored in the auxiliary storage device 103 is loaded to the memory 102 as necessary.

Note that ROM stands for Read-Only Memory.

Note that HDD stands for Hard Disk Drive.

The communication device 104 is a receiver/transmitter. For example, the communication device 104 is a communication chip or an NIC.

Note that NIC stands for Network Interface Card.

The input/output interface 105 is a port to which an input device and an output device are to be connected.

The virtual map providing device 100 is provided with elements such as a virtual map generation unit 110, a virtual map delivery unit 120, a peripheral information collection unit 130, a traffic information generation unit 140, a virtual information generation unit 150, and a virtual information delivery unit 160. These elements are implemented by software.

A virtual map providing program to cause the computer to function as the virtual map generation unit 110, the virtual map delivery unit 120, the peripheral information collection unit 130, the traffic information generation unit 140, the virtual information generation unit 150, and the virtual information delivery unit 160 is stored in the auxiliary storage device 103. The virtual map providing program is loaded to the memory 102 and run by the processor 101.

An OS is also stored in the auxiliary storage device 103. At least part of the OS is loaded to the memory 102 and run by the processor 101.

The processor 101 runs the virtual map providing program while running the OS.

Note that OS stands for Operating System.

Input/output data of the virtual map providing program is stored in a storage unit 190.

The memory 102 functions as the storage unit 190. Alternatively, a storage device such as the auxiliary storage device 103, a register in the processor 101, and a cache memory in the processor 101 may function as the storage unit 190 in place of the memory 102 or together with the memory 102.

The virtual map providing device 100 may be provided with a plurality of processors that replace the processor 101.

The virtual map providing program can be computer-readably recorded (stored) in a non-volatile recording medium such as an optical disk and a flash memory.

Figure 3:
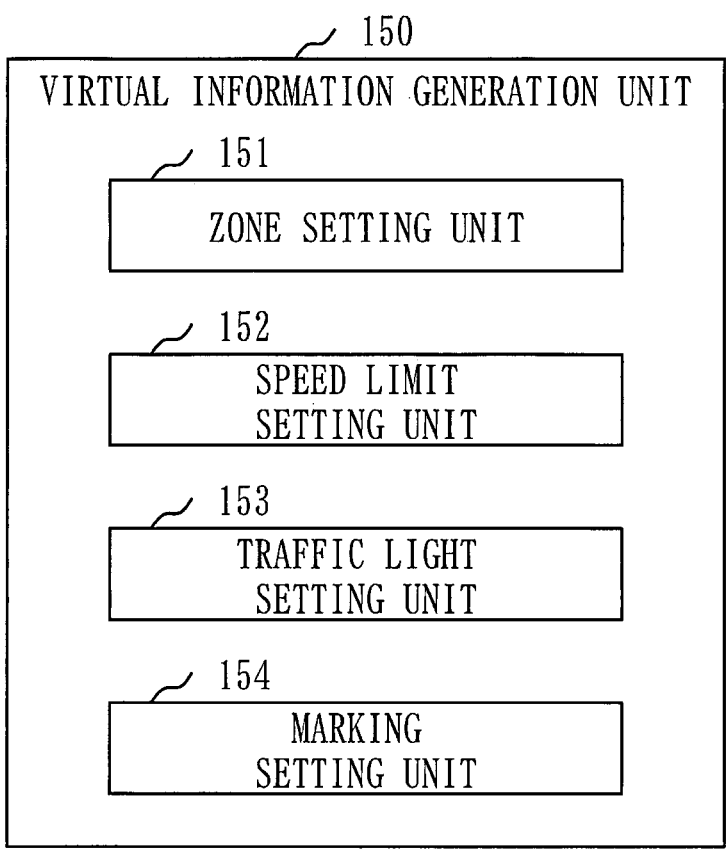
FIG. 3 is a configuration diagram of a virtual information generation unit 150 in Embodiment 1.

A configuration of the virtual information generation unit 150 will be described with referring to FIG. 3.

The virtual information generation unit 150 is provided with elements such as a zone setting unit 151, a speed limit setting unit 152, a traffic light setting unit 153, and a sign setting unit 154. Functions of the individual elements will be described later.

Figure 4:
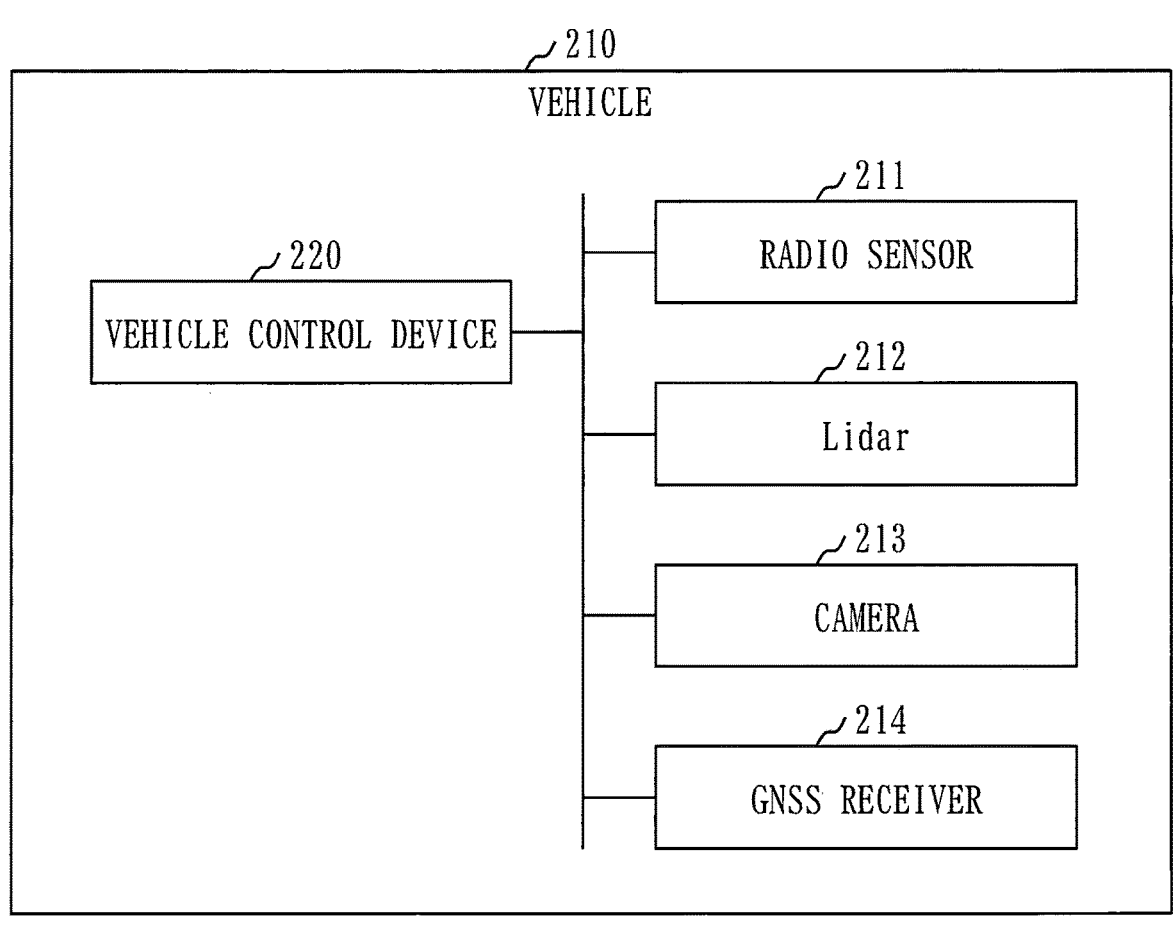
FIG. 4 is a configuration diagram of a vehicle 210 in Embodiment 1.

A configuration of the vehicle 210 will be described with referring to FIG. 4.

A sensor group and a vehicle control device 220 are mounted in the vehicle 210.

The sensor group consists of one or more sensors to observe the periphery of the vehicle 210. Specifically, the vehicle 210 is provided with sensors such as a radio sensor 211, a Lidar 212, a camera 213, and a GNSS receiver 214.

The radio sensor 211 detects an object existing on the periphery of the vehicle 210 by utilizing radio waves.

The Lidar 212 detects the object existing on the periphery of the vehicle 210 by utilizing laser light.

The camera 213 photographs the periphery of the vehicle 210.

The GNSS receiver 214 is a receiver for positioning and performs positioning by utilizing GNSS. Note that GNSS stands for Global Navigation Satellite System.

Figure 5:
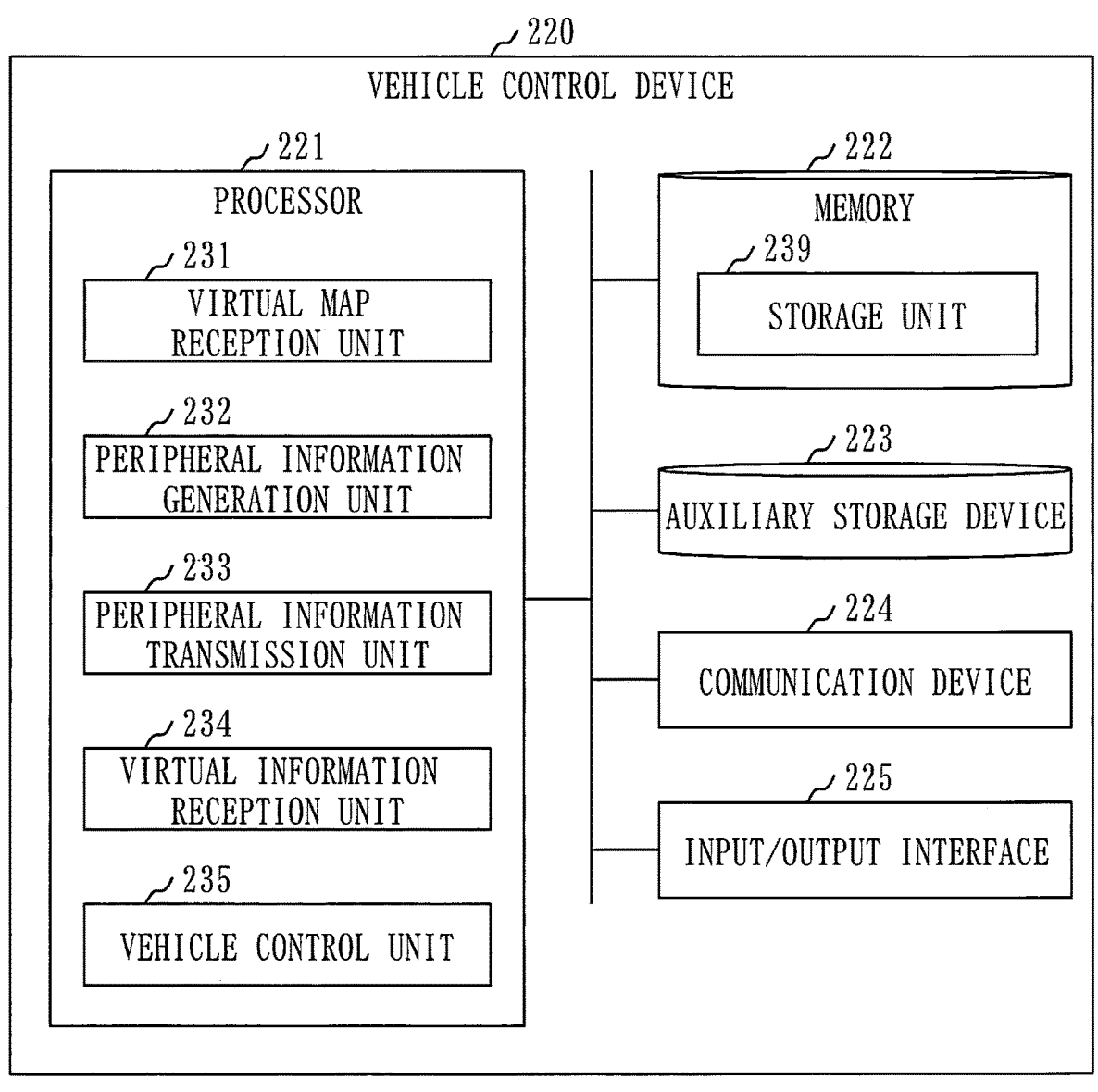
FIG. 5 is a configuration diagram of a vehicle control device 220 in Embodiment 1.

A configuration of the vehicle control device 220 will be described with referring to FIG. 5.

The vehicle control device 220 is a computer provided with hardware devices such as a processor 221, a memory 222, an auxiliary storage device 223, a communication device 224, and an input/output interface 225. These hardware devices are connected to each other via a signal line.

The processor 221 is an IC to perform computation processing and controls the other hardware devices. For example, the processor 221 is a CPU, a DSP, or a GPU.

The memory 222 is a volatile or non-volatile storage device. The memory 222 is also called a main storage device or a main memory. For example, the memory 222 is a RAM. Data stored in the memory 222 is saved in the auxiliary storage device 223 as necessary.

The auxiliary storage device 223 is a non-volatile storage device. For example, the auxiliary storage device 223 is a ROM, an HDD, or a flash memory. Data stored in the auxiliary storage device 223 is loaded to the memory 222 as necessary.

The communication device 224 is a receiver/transmitter. For example, the communication device 224 is a communication chip or an NIC.

The input/output interface 225 is a port to which an input device and an output device are to be connected.

The vehicle control device 220 is provided with elements such as a virtual map reception unit 231, a peripheral information generation unit 232, a peripheral information transmission unit 233, a virtual information reception unit 234, and a vehicle control unit 235. These elements are implemented by software.

A vehicle control program to cause the computer to function as the virtual map reception unit 231, the peripheral information generation unit 232, the peripheral information transmission unit 233, the virtual information reception unit 234, and the vehicle control unit 235 is stored in the auxiliary storage device 223. The vehicle control program is loaded to the memory 222 and run by the processor 221.

An OS is also stored in the auxiliary storage device 223. At least part of the OS is loaded to the memory 222 and run by the processor 221.

The processor 221 runs the vehicle control program while running the OS.

Input/output data of the vehicle control program is stored in a storage unit 239.

The memory 222 functions as the storage unit 239. Alternatively, a storage device such as the auxiliary storage device 223, a register in the processor 221, and a cache memory in the processor 221 may function as the storage unit 239 in place of the memory 222 or together with the memory 222.

The vehicle control device 220 may be provided with a plurality of processors that replace the processor 221.

The vehicle control program can be computer-readably recorded (stored) in a non-volatile recording medium such as an optical disk and a flash memory.

*Description of Operations*

A procedure of operations of the virtual map providing device 100 corresponds to a virtual map providing method. Also, the procedure of the operations of the virtual map providing device 100 also corresponds to a procedure of processing performed by the virtual map providing program.

The virtual map providing method will be described with referring to FIG. 6.

In step S110, the virtual map generation unit 110 generates the virtual map data.

The virtual map data includes map information data and virtual information data.

The map information data is data expressing map information and is stored in the storage unit 190 in advance. The map information includes information expressing the driveway 201, and so on.

The virtual information data is data expressing virtual information and is generated by the virtual information generation unit 150. The virtual information includes information expressing a virtual lane, information expressing a virtual traffic light, information expressing a virtual sign, and so on. The virtual lane is a lane that does not exist physically. The virtual traffic light is a traffic light that does not exist physically. The virtual sign is a sign that does not exist physically.

In step S120, the virtual map delivery unit 120 delivers the virtual map data to the one or more vehicles 210 by using the communication device 104.

For example, the virtual map delivery unit 120 transmits the virtual map data to the roadside machine 202, thereby delivering the virtual map data from the roadside machine 202 to the one or more vehicles 210.

In each vehicle 210, the virtual map reception unit 231 receives the virtual map data by using the communication device 224. Then, the vehicle control unit 235 controls the vehicle 210 by utilizing the virtual map data.

For example, the vehicle control unit 235 performs autonomous driving by controlling a steering wheel, an accelerator, and a brake.

For example, the vehicle control unit 235 informs a driver of the virtual information through an image or audio by controlling a display or a loudspeaker.

In step S130, the peripheral information collection unit 130 collects the peripheral information data from the one or more vehicles 210 traveling on the driveway 201.

First, in each vehicle 210, the sensor group including, for example, the radio sensor 211, the Lidar 212, the camera 213, and the GNSS receiver 214 performs peripheral observation. The radio sensor 211 and the Lidar 212 detect an object existing on the periphery. A specific example of the object to be detected is another vehicle. The camera 213 photographs the periphery. An image obtained by photographing shows the object existing on the periphery. The GNSS receiver 214 finds a position of the vehicle 210.

Next, in each vehicle 210, the peripheral information generation unit 232 generates the peripheral information data on a basis of an observation result obtained by the sensor group.

The peripheral information data expresses peripheral information of the vehicle 210. The peripheral information includes information expressing the position of the vehicle 210 and information of the object existing on the periphery of the vehicle 210.

Next, in each vehicle 210, the peripheral information transmission unit 233 transmits the peripheral information data to the virtual map providing device 100 with using the communication device 224. For example, the peripheral information data is transmitted to the virtual map providing device 100 via the roadside machine 202.

Then, in the virtual map providing device 100, the peripheral information collection unit 130 receives the peripheral information data of each vehicle 210 with using the communication device 104.

In step S140, the traffic information generation unit 140 generates traffic information data on a basis of the collected peripheral information data.

The traffic information data expresses traffic information of the driveway 201. The traffic information includes inbound traffic jam information, outbound traffic jam information, and so on. The inbound traffic jam information expresses a traffic jam situation in the inbound direction. The outbound traffic jam information expresses a traffic jam situation in the outbound direction.

In step S150, the virtual information generation unit 150 generates change information data on a basis of the traffic information data and so on.

The change information data expresses change information. The change information includes vehicle zone information, virtual pedestrian crossing information, virtual traffic light information, virtual sign information, and so on.

The vehicle zone information is information of a zone on which each vehicle 210 moves, and includes inbound zone information, outbound zone information, speed limit information, and so on.

The inbound zone information expresses an inbound zone of the driveway 201. The inbound zone is a zone on which one or more inbound vehicles are to move, and includes one or more virtual inbound lanes. The virtual inbound lane is an inbound lane that does not exist physically.

The outbound zone information expresses an outbound zone of the driveway 201. The outbound zone is a zone on which one or more outbound vehicles are to move, and includes one or more virtual outbound lanes. The virtual outbound lane is an outbound lane that does not exist physically.

The speed limit information expresses a speed limit of the inbound zone and a speed limit of the outbound zone.

Figure 7:
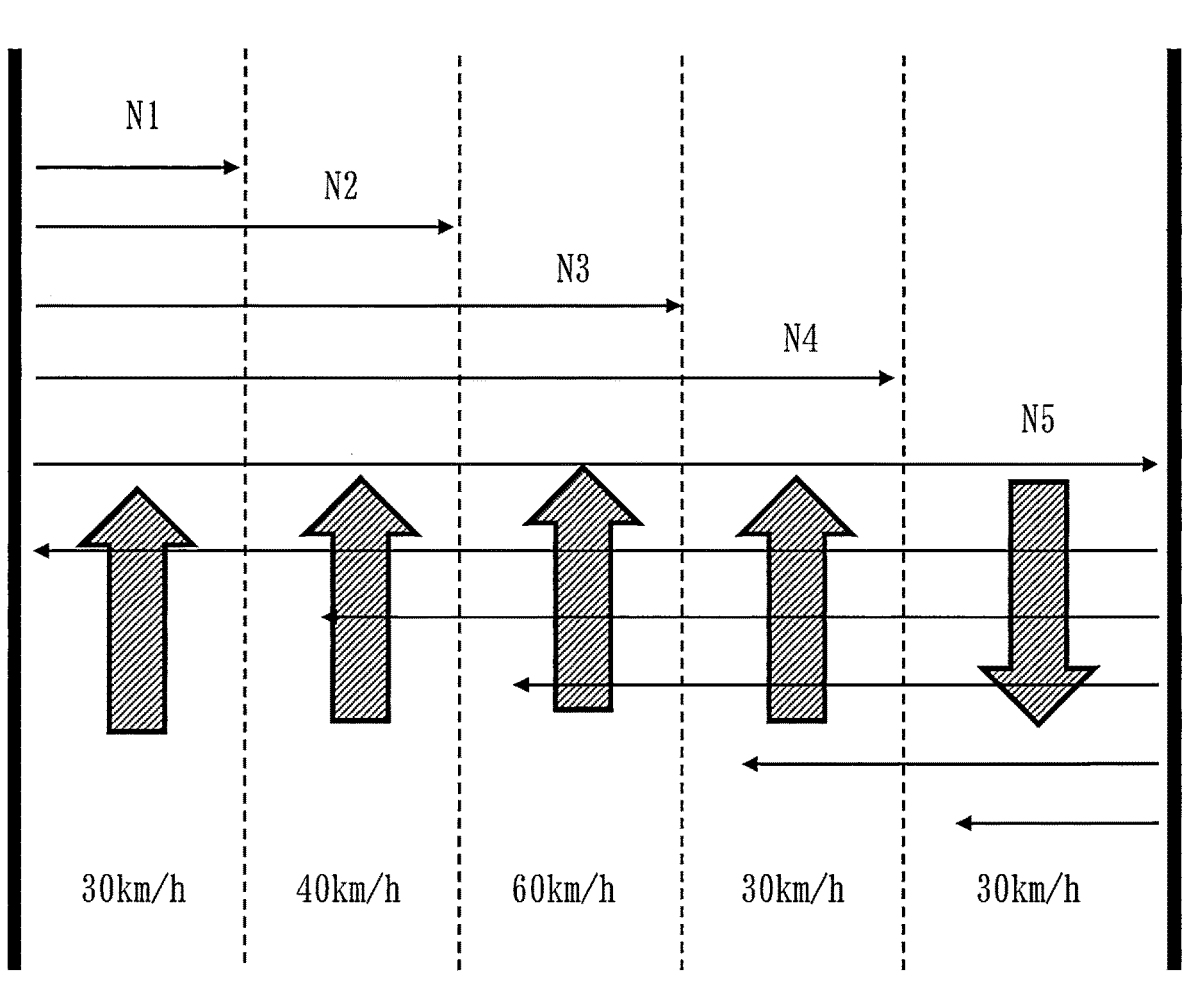
FIG. 7 is a schematic diagram of vehicle zone information in Embodiment 1.
Figure 7:

FIG. 7 illustrates an overview of the vehicle zone information.

In the vehicle zone information, the inbound zone, the outbound zone, and the individual virtual lanes are set in respect of, for example, distances from a left edge (or right edge) of the driveway 201.

In FIG. 7, a zone up to N4 meters from the left edge is an inbound zone, and a zone up to (N5–N4) meters from an N4-meter portion from the left edge is an outbound zone.

A zone up to N1 meters from the left edge is a first virtual inbound lane. A speed limit of the first virtual inbound lane is 30 kilometers per hour.

A second virtual inbound lane, a third virtual inbound lane, a fourth virtual inbound lane, and a virtual outbound lane are set in the same manner.

Figure 6:
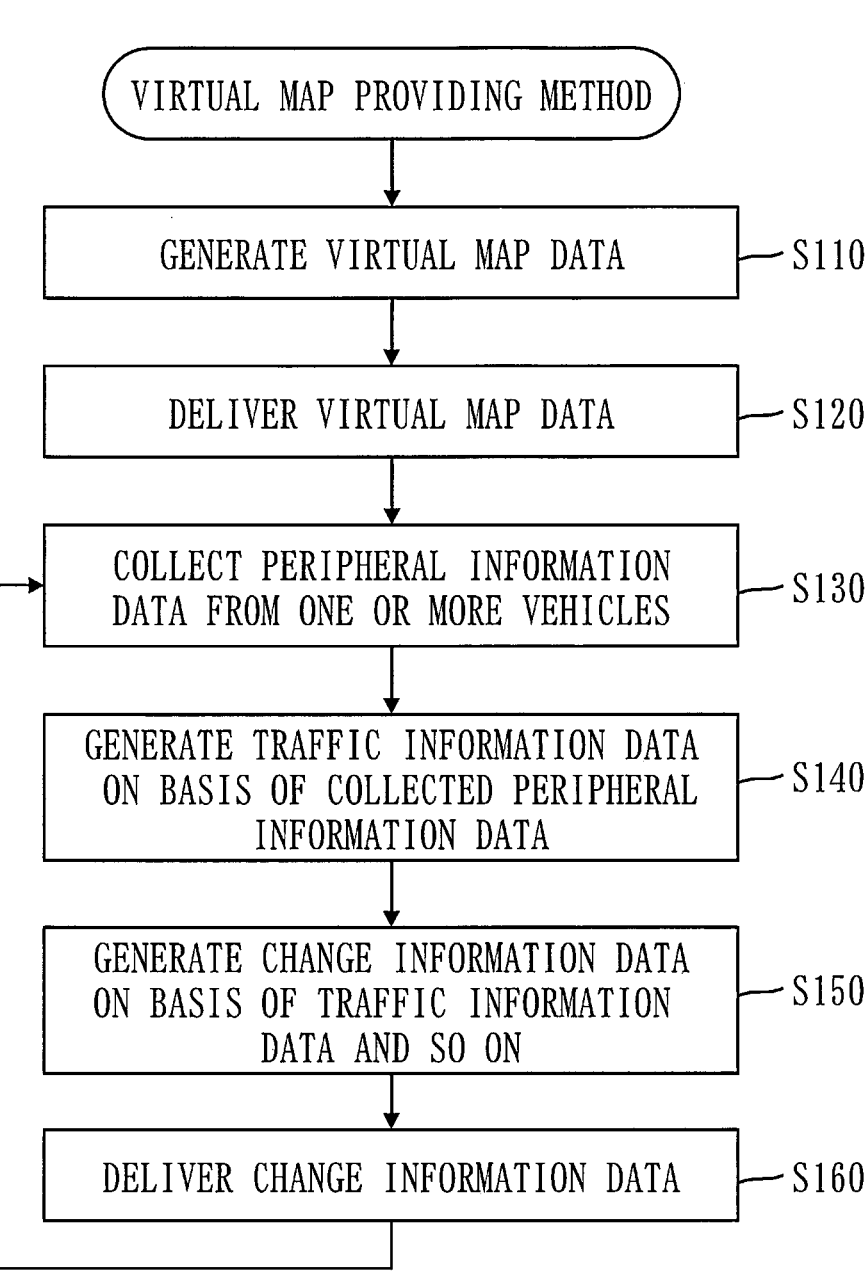
FIG. 6 is a flowchart of a virtual map providing method in Embodiment 1.

Back to FIG. 6, explanation on step S150 will continue.

The zone setting unit 151 dynamically changes the inbound zone and the outbound zone by at least either one of (A1) and (A2).

(A1) The zone setting unit 151 changes the inbound zone and the outbound zone on a basis of the traffic jam situation in the inbound direction of the driveway 201 and the traffic jam situation in the outbound direction of the driveway 201.

For example, when a traffic jam occurs in the inbound direction of the driveway 201, the zone setting unit 151 narrows the outbound zone to decrease the virtual outbound lanes, and widens the inbound zone to increase the virtual inbound lanes.

For example, when a traffic jam occurs in the outbound direction of the driveway 201, the zone setting unit 151 narrows the inbound zone to decrease the virtual inbound lanes, and widens the outbound zone to increase the virtual outbound lanes.

(A2) The zone setting unit 151 changes the inbound zone and the outbound zone depending on a timeframe.

For example, in the morning, the zone setting unit 151 narrows the outbound zone to decrease the virtual outbound lanes, and widens the inbound zone to increase the virtual inbound lanes.

For example, in the nighttime, the zone setting unit 151 narrows the inbound zone to decrease the virtual inbound lanes, and widens the outbound zone to increase the virtual outbound lanes.

In other words, the zone setting unit 151 changes an inbound lane into an outbound lane. Alternatively, the zone setting unit 151 changes an outbound lane into an inbound lane. That is, the zone setting unit 151 changes a traveling direction on the lane.

Figure 8:
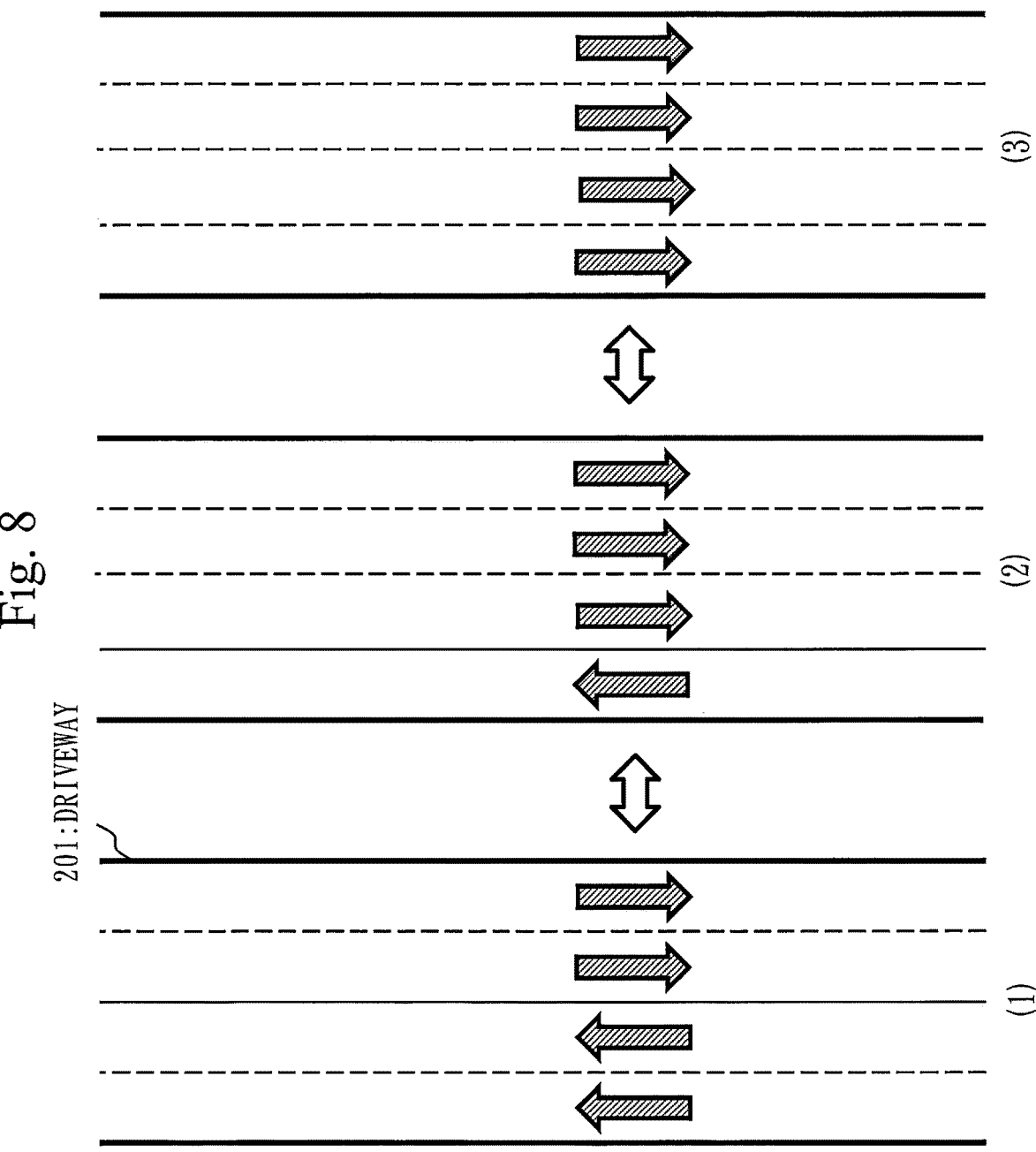
FIG. 8 is a diagram illustrating change examples of an inbound zone and an outbound zone in Embodiment 1.

FIG. 8 illustrates change examples of an inbound zone and an outbound zone.

(1) A width of the inbound zone and a width of the outbound zone are equal. A number of virtual inbound lanes is 2, and a number of virtual outbound lanes is 2.

(2) The inbound zone is narrower than the outbound zone. The number of virtual inbound lanes is 1, and the number of virtual outbound lanes is 3.

(3) The driveway 201 is entirely an outbound lane. The number of virtual inbound lanes is 0, and the number of virtual outbound lanes is 4.

Back to FIG. 6, explanation on step S150 will continue.

The zone setting unit 151 changes the inbound zone and the outbound zone by a following procedure.

Before changing part of the outbound zone into the inbound zone, or before changing part of the inbound zone into the outbound zone, the zone setting unit 151 changes a zone of that part into a displacement zone. In the displacement zone, each vehicle 210 is requested to be displaced to another zone.

After changing the zone of that part into the displacement zone, when a displacement end condition is satisfied, the zone setting unit 151 changes the zone of that part into a prohibited zone. In the prohibited zone, each vehicle 210 is prohibited from traveling.

For example, the zone setting unit 151 measures a time elapsed since changing the zone of that part into the displacement zone. When the time elapsed reaches a regulation time, the zone setting unit 151 changes the zone of that part into the prohibited zone.

After changing the zone of that part into the prohibited zone, when a prohibition end condition is satisfied, the zone setting unit 151 changes the zone of that part into the inbound zone or the outbound zone.

For example, the zone setting unit 151 measures a time elapsed since changing the zone of that part into the prohibited zone. When the time elapsed reaches a regulation time, the zone setting unit 151 changes the zone of that part into the inbound zone or the outbound zone.

For example, the zone setting unit 151 refers to traffic information of the zone of that part indicated in the traffic information data, and decides whether a vehicle 210 exists in the zone of that part. When no vehicle 210 exists in the zone of that part any longer, the zone setting unit 151 changes the zone of that part into the inbound zone or the outbound zone.

Figure 9:
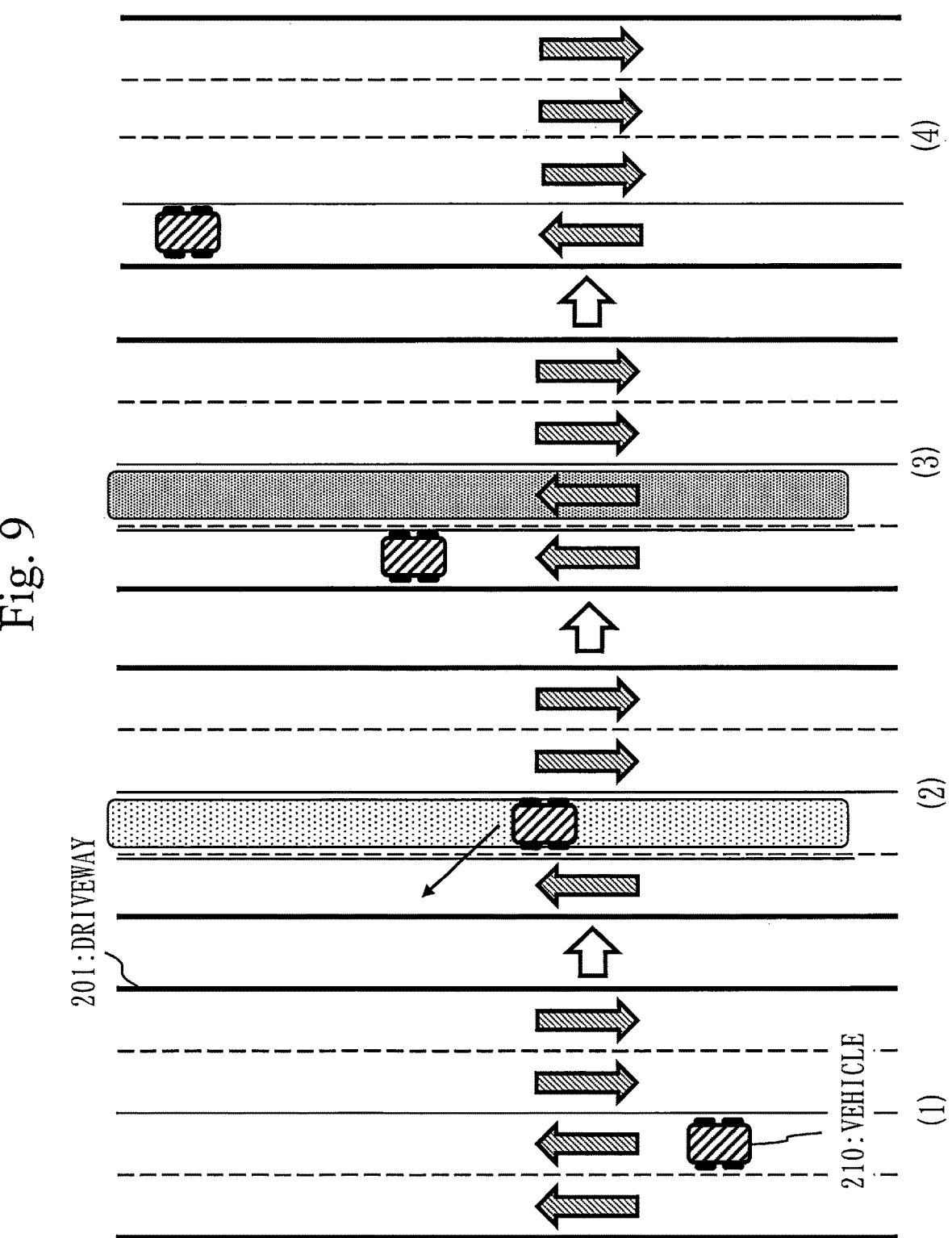
FIG. 9 is a diagram illustrating a change procedure of the inbound zone and the outbound zone in Embodiment 1.

FIG. 9 illustrates a procedure of changing the second virtual inbound lane into a third virtual outbound lane.

(1) The vehicle 210 is traveling on the second virtual inbound lane.

(2) The zone setting unit 151 changes the second virtual inbound lane into the displacement zone. The vehicle 210 is displaced to the first virtual inbound lane.

(3) The zone setting unit 151 changes the displacement zone into a prohibited zone.

(4) The zone setting unit 151 changes the prohibited zone into the third virtual outbound lane.

Back to FIG. 6, explanation on step S150 will continue.

The speed limit setting unit 152 dynamically changes a speed limit of the inbound zone and a speed limit of the outbound zone by at least either one of (B1) and (B2).

(B1) The speed limit setting unit 152 changes the speed limit of the inbound zone and the speed limit of the outbound zone on the basis of the traffic jam situation in the inbound direction of the driveway 201 and the traffic jam situation in the outbound direction of the driveway 201.

For example, the speed limit setting unit 152 increases the speed limit of the inbound zone when the driveway 201 starts to be less crowded in the inbound direction, and lowers the speed limit of the inbound zone when the driveway 201 starts to be crowded in the inbound direction. The speed limit setting unit 152 changes the speed limit of the outbound zone likewise.

(B2) The speed limit setting unit 152 changes the speed limit of the inbound zone and the speed limit of the outbound zone depending on the timeframe.

The virtual pedestrian crossing information is information of a virtual pedestrian crossing, and expresses a location of the virtual pedestrian crossing, and so on. The virtual pedestrian crossing is a zone through which a pedestrian and the like are to cross the driveway 201.

The virtual traffic light information is information of a virtual traffic light, and expresses a position of the virtual traffic light, a light color of the virtual traffic light, and so on. The virtual traffic light is employed to cause the vehicles 210 to stop before the virtual pedestrian crossing.

Figure 10:
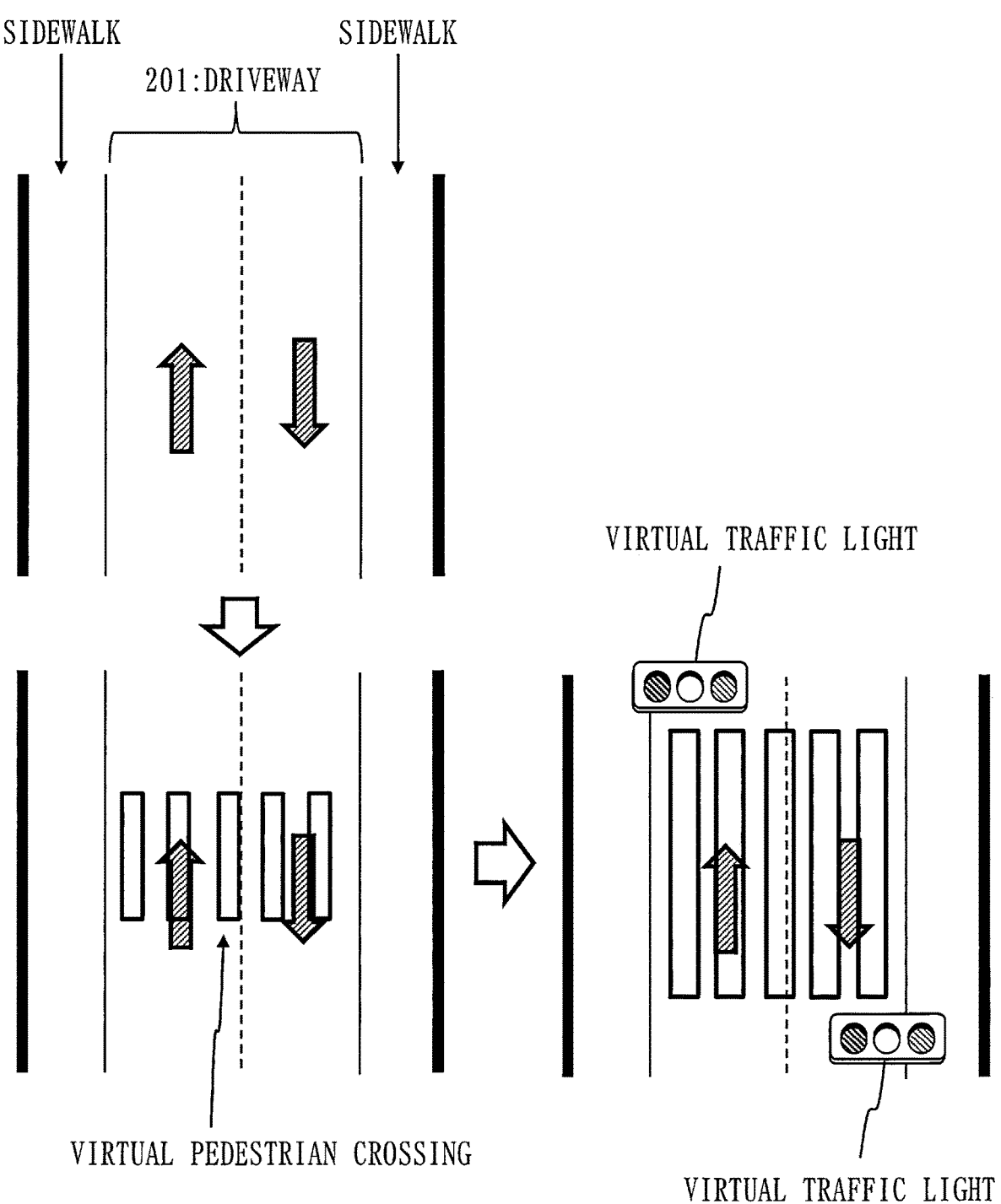
FIG. 10 is a diagram illustrating a virtual pedestrian crossing and virtual traffic lights in Embodiment 1.

FIG. 10 illustrates how a virtual pedestrian crossing and virtual traffic lights are set.

The traffic light setting unit 153 dynamically changes the virtual pedestrian crossing and the virtual traffic lights.

For example, the traffic light setting unit 153 sets the virtual pedestrian crossing at a particular place on the driveway 201, sets the virtual traffic lights before the virtual pedestrian crossing, and changes light colors of the virtual traffic lights at regulation timings.

Back to FIG. 6, explanation of step S150 will continue.

The virtual sign information is information of a virtual sign and expresses a position of the virtual sign, a meaning of the virtual sign, and so on.

The sign setting unit 154 dynamically changes the virtual sign. For example, the sign setting unit 154 sets a virtual sign at a particular position of the driveway 201, and changes the meaning of the virtual sign depending on the timeframe.

In step S160, the virtual information delivery unit 160 delivers the change information data to the one or more vehicles 210 with using the communication device 104. For example, the virtual information delivery unit 160 transmits the change information data to the roadside machine 202, thereby delivering the change information data from the roadside machine 202 to the one or more vehicles 210.

In each vehicle 210, the virtual information reception unit 234 receives the change information data by using the communication device 224. Then, the vehicle control unit 235 controls the vehicle 210 by utilizing the virtual map data and the change information data.

For example, the vehicle control unit 235 performs autonomous driving by controlling the steering wheel, the accelerator, and the brake.

For example, the vehicle control unit 235 informs the driver of the virtual information through an image or audio by controlling the display or the loudspeaker.

Step S130 through step S160 are executed repeatedly.
*Effect of Embodiment 1*

Embodiment 1 enables fully effective use of the driveway 201 entirely.

For example, when the number of inbound vehicles is larger than the number of outbound vehicles, the virtual outbound lanes can be decreased by narrowing the outbound zone, and the virtual inbound lanes can be increased by widening the inbound zone. This leads to fully effective use of the driveway 201 entirely.

Embodiment 2

A virtual map providing system 300 will be described mainly regarding a difference from Embodiment 1, with referring to FIGS. 11 to 15.
*Description of Configurations*

Figure 11:
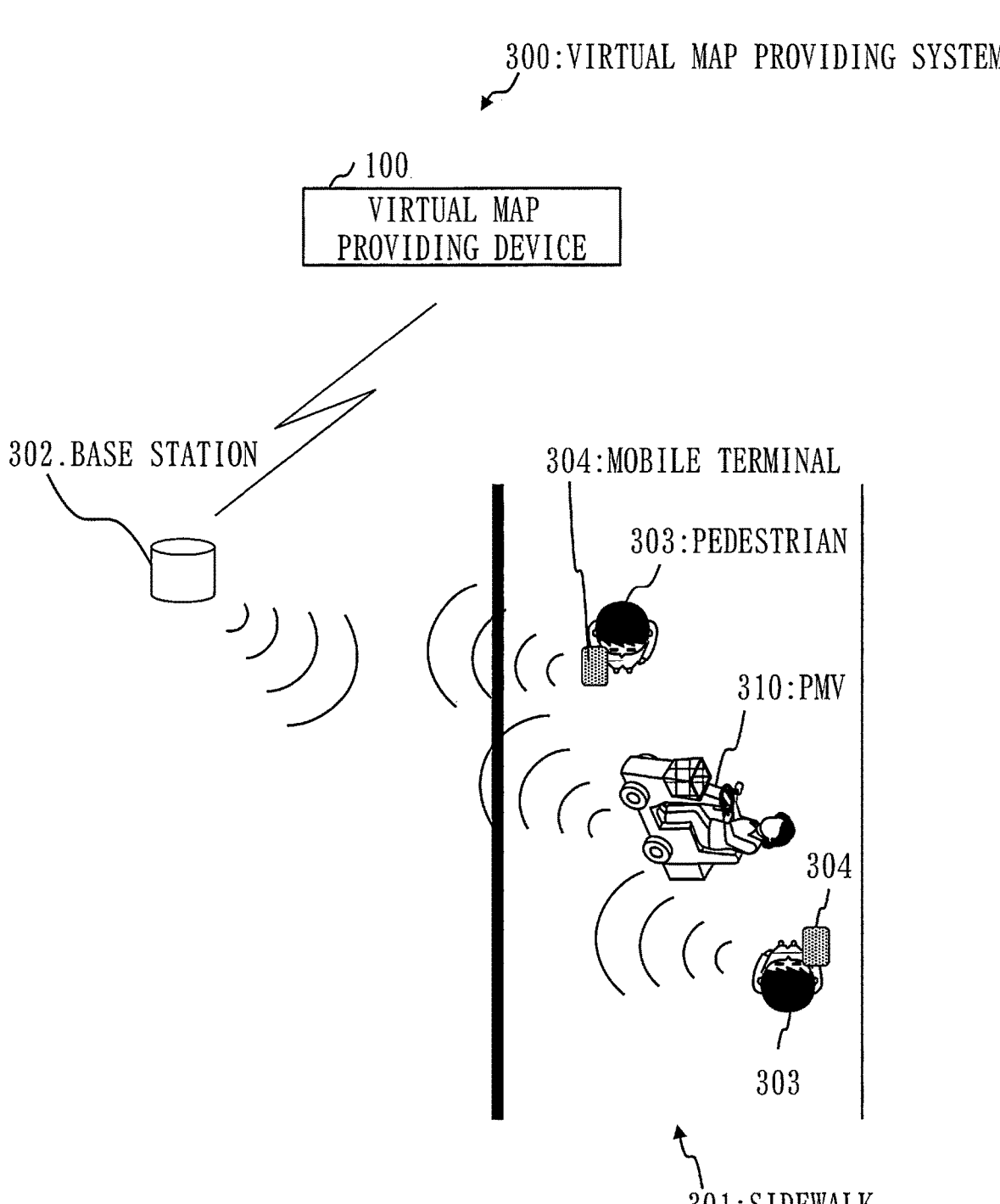
FIG. 11 is a configuration diagram of a virtual map providing system 300 in Embodiment 2.

A configuration of the virtual map providing system 300 will be described with referring to FIG. 11.

The virtual map providing system 300 is a system to deliver virtual map data to one or more PMVs 310 and one or more mobile terminals 304.

Note that PMV stands for personal mobile vehicle.

The virtual map providing system 300 is equipped with a virtual map providing device 100.

The virtual map providing device 100 delivers the virtual map data to the one or more PMVs 310 and the one or more mobile terminal 304. For example, the virtual map providing system 300 delivers the virtual map data via a base station 302. The base station 302 corresponds to the roadside machine 202 in Embodiment 1.

A configuration of the virtual map providing device 100 is the same as the counterpart configuration in Embodiment 1.

The PMV 310 is a mobile body that carries a person and moves on a sidewalk 301. For example, the PMV 310 is an electric wheelchair.

The PMV 310 moves on the sidewalk 301 by utilizing the virtual map data.

The PMV 310 corresponds to the vehicle 210 in Embodiment 1.

The mobile terminal 304 is a device a pedestrian 303 carries. For example, the mobile terminal 304 is a smartphone or a head-mounted display.

The mobile terminal 304 notifies the pedestrian 303 of information of the virtual map data through an image, audio, or the like.

The pedestrian 303 moves on the sidewalk 301 while checking notification from the mobile terminal 304.

The sidewalk 301 is a road on which one or more pedestrians 303 and the one or more PMVs 310 are to move.

Figure 12:
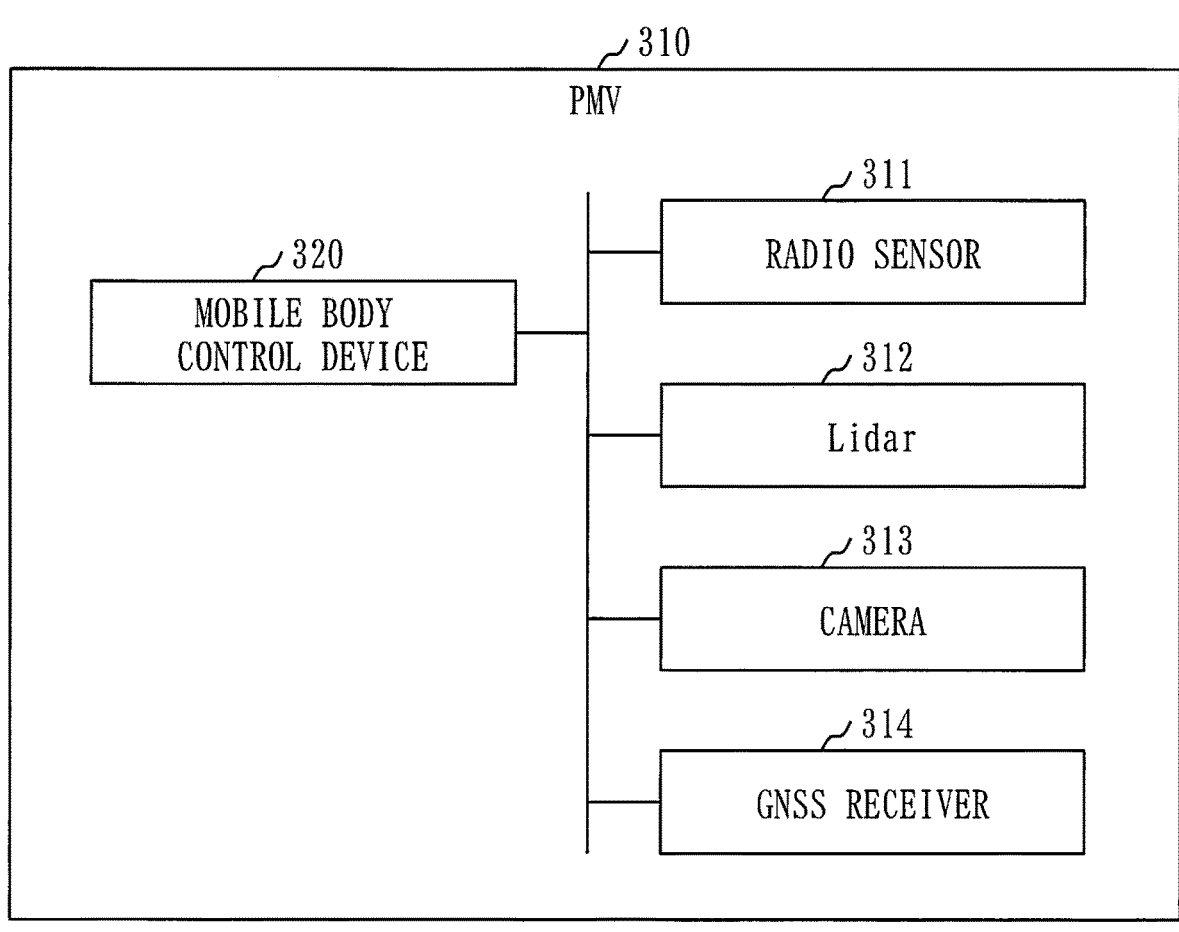
FIG. 12 is a configuration diagram of a PMV 310 in Embodiment 2.

A configuration of the PMV 310 will be described with referring to FIG. 12.

A sensor group and a mobile body control device 320 are mounted in the PMV 310.

The sensor group consists of one or more sensors to observe a periphery of the PMV 310. Specifically, the PMV 310 is provided with sensors such as a radio sensor 311, a Lidar 312, a camera 313, and a GNSS receiver 314.

The radio sensor 311 detects an object existing on a periphery of the PMV 310 by utilizing radio waves.

The Lidar 312 detects the object existing on the periphery of the PMV 310 by utilizing laser light.

The camera 313 photographs the periphery of the PMV 310.

The GNSS receiver 314 is a receiver for positioning and performs positioning by utilizing GNSS.

Figure 13:
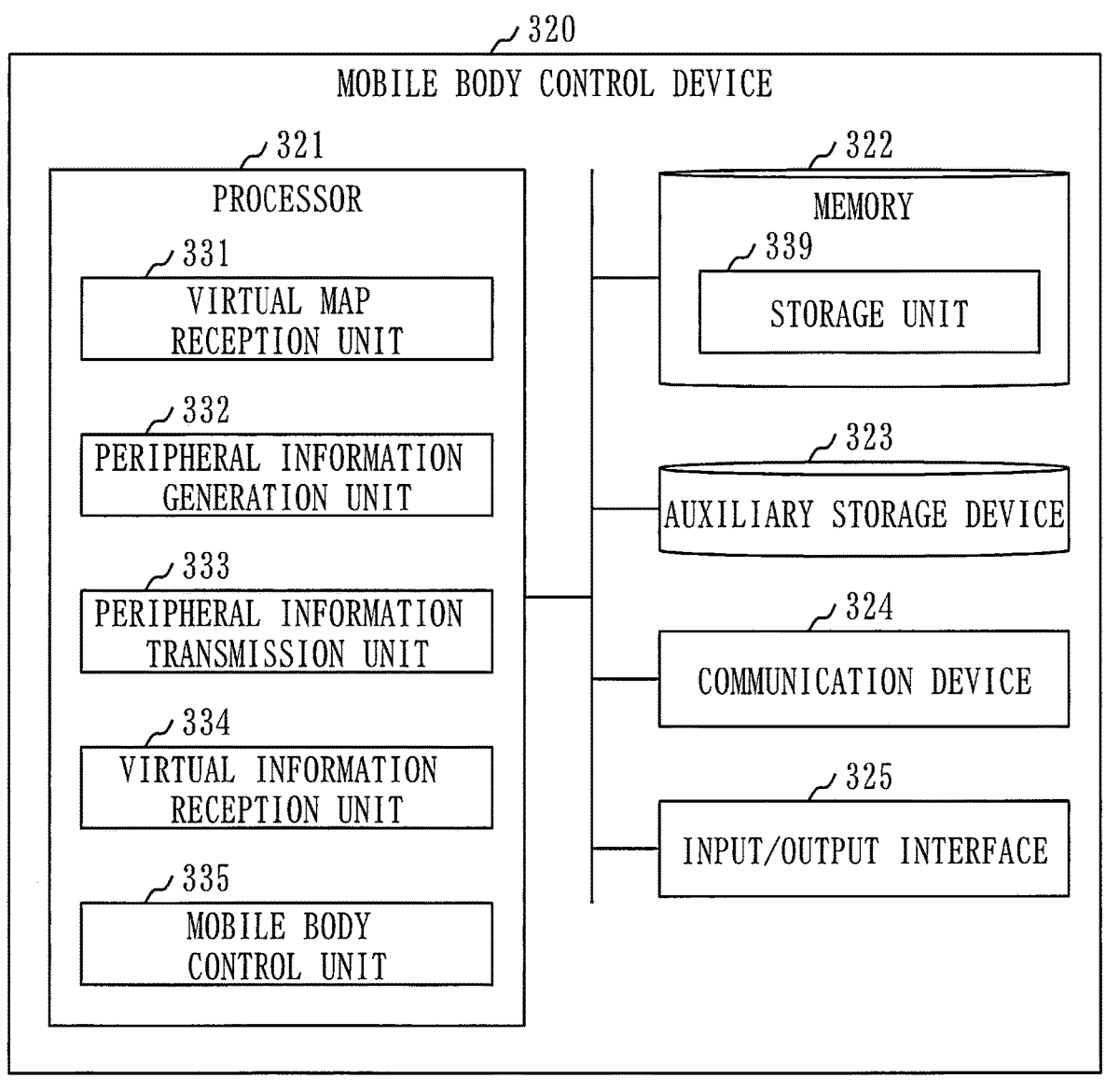
FIG. 13 is a configuration diagram of a mobile body control device 320 in Embodiment 2.

A configuration of the mobile body control device 320 will be described with referring to FIG. 13.

The mobile body control device 320 is a computer provided with hardware devices such as a processor 321, a memory 322, an auxiliary storage device 323, a communication device 324, and an input/output interface 325. These hardware devices are connected to each other via a signal line.

The processor 321 is an IC to perform computation processing and controls the other hardware devices. For example, the processor 321 is a CPU, a DSP, or a GPU.

The memory 322 is a volatile or non-volatile storage device. The memory 322 is also called a main storage device or a main memory. For example, the memory 322 is a RAM. Data stored in the memory 322 is saved in the auxiliary storage device 323 as necessary.

The auxiliary storage device 323 is a non-volatile storage device. For example, the auxiliary storage device 323 is a ROM, an HDD, or a flash memory. Data stored in the auxiliary storage device 323 is loaded to the memory 322 as necessary.

The communication device 324 is a receiver/transmitter. For example, the communication device 324 is a communication chip or an NIC.

The input/output interface 325 is a port to which an input device and an output device are to be connected.

The mobile body control device 320 is provided with elements such as a virtual map reception unit 331, a peripheral information generation unit 332, a peripheral information transmission unit 333, a virtual information reception unit 334, and a mobile body control unit 335. These elements are implemented by software.

A mobile body control program to cause the computer to function as the virtual map reception unit 331, the peripheral information generation unit 332, the peripheral information transmission unit 333, the virtual information reception unit 334, and the mobile body control unit 335 is stored in the auxiliary storage device 323. The mobile body control program is loaded to the memory 322 and run by the processor 321.

An OS is also stored in the auxiliary storage device 323. At least part of the OS is loaded to the memory 322 and run by the processor 321.

The processor 321 runs the mobile body control program while running the OS.

Input/output data of the mobile body control program is stored in a storage unit 339.

The memory 322 functions as the storage unit 339. Alternatively, a storage device such as the auxiliary storage device 323, a register in the processor 321, and a cache memory in the processor 321 may function as the storage unit 339 in place of the memory 322 or together with the memory 322.

The mobile body control device 320 may be provided with a plurality of processors that replace the processor 321.

The mobile body control program can be computer-readably recorded (stored) in a non-volatile recording medium such as an optical disk and a flash memory.

*Description of Operations*

A virtual map providing method will be described with referring to FIG. 14.

In step S210, the virtual map generation unit 110 generates virtual map data.

Step S210 corresponds to step S110 in Embodiment 1.

In step S220, a virtual map delivery unit 120 delivers the virtual map data to the one or more PMVs 310 and the one or more mobile terminals 304 by using a communication device 104.

For example, the virtual map delivery unit 120 transmits the virtual map data to the base station 302, thereby delivering the virtual map data from the base station 302 to the one or more PMVs 310 and the one or more mobile terminals 304.

In each PMV 310, the virtual map reception unit 331 receives the virtual map data by using the communication device 324. Then, the mobile body control unit 335 controls the PMV 310 by utilizing the virtual map data.

For example, the mobile body control unit 335 performs autonomous driving by controlling an operation lever or the like.

For example, the mobile body control unit 335 informs a user of virtual information through an image or audio by controlling a display or a loudspeaker.

Each mobile terminal 304 receives the virtual map data and informs the pedestrian 303 of information of the virtual map data through an image, audio, or the like.

The pedestrian 303 moves while checking notification from the mobile terminal 304.

In step S230, a peripheral information collection unit 130 collects peripheral information data from the one or more PMVs 310 moving on the sidewalk 301.

The peripheral information collection unit 130 also collects position information from the one or more mobile terminals 304 moving on the sidewalk 301.

The collection method in step S230 is the same as the collection method in step S130 of Embodiment 1.

In step S240, a traffic information generation unit 140 generates traffic information data on a basis of the collected peripheral information data.

The traffic information data expresses traffic information of the sidewalk 301. The traffic information includes congestion information of the sidewalk 301, and so on. The congestion information expresses a congestion situation of the sidewalk 301.

In step S250, a virtual information generation unit 150 generates change information data on a basis of the traffic information data and so on.

The change information data expresses change information. The change information includes pedestrian zone information, mobile body zone information, and so on.

The pedestrian zone information is information of a pedestrian zone.

The pedestrian zone is a zone on which the pedestrian 303 is to move.

The mobile body zone information is information of a mobile body zone.

The mobile body zone is a zone on which the PMVs 310 are to move.

The mobile body zone information includes inbound zone information, outbound zone information, and so on.

The inbound zone information expresses an inbound zone of the mobile body zone. The inbound zone is a zone on which one or more inbound mobile bodies are to move, and includes one or more virtual inbound passages. An inbound mobile body is an PMV 310 that moves in the inbound direction.

The outbound zone information expresses an outbound zone of the mobile body zone. The outbound zone is a zone on which one or more outbound mobile bodies are to move, and includes one or more virtual outbound passages. An outbound mobile body is an PMV 310 that moves in the outbound direction.

Figure 15:
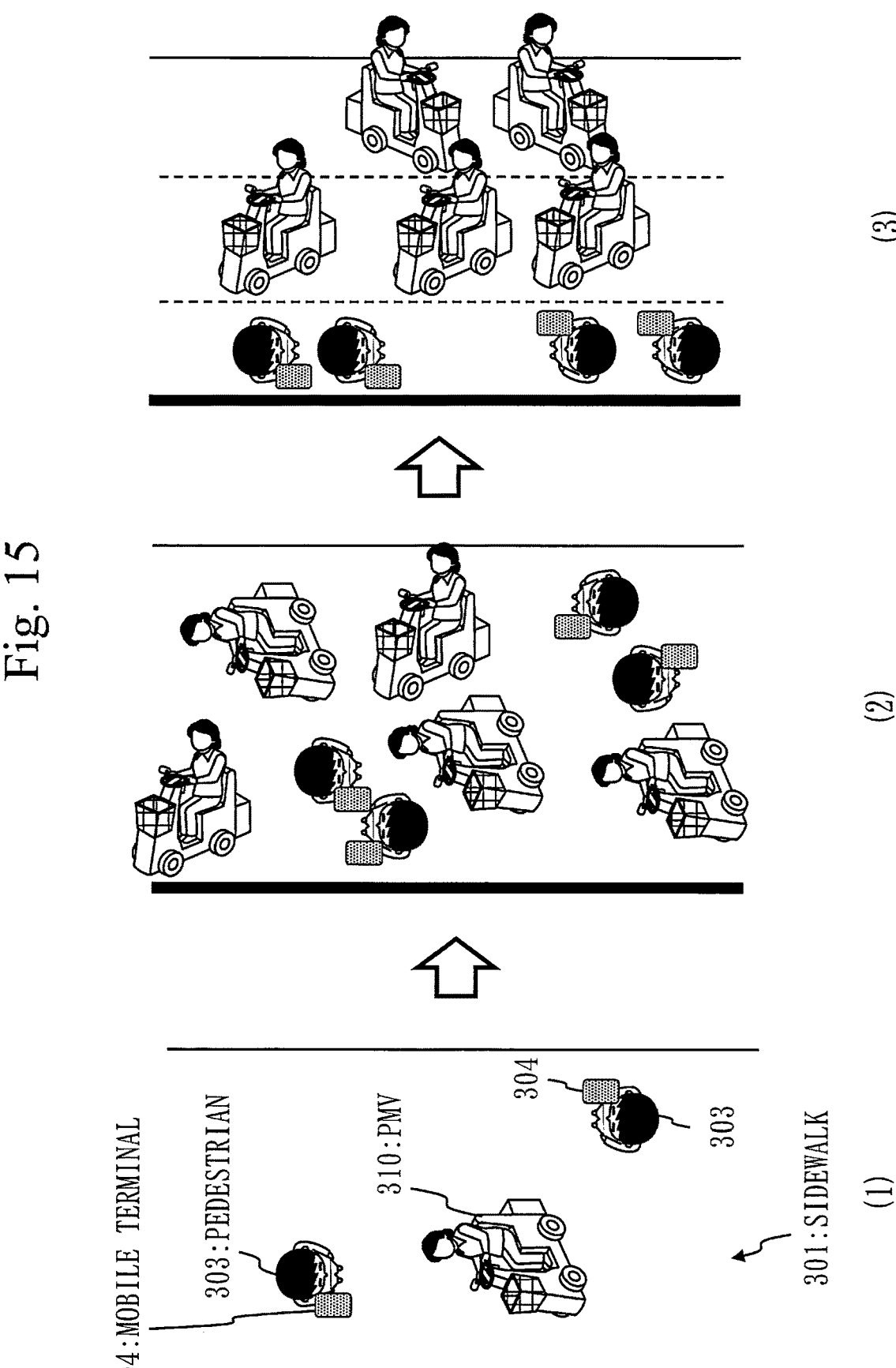
FIG. 15 is a diagram illustrating a pedestrian zone and a mobile body zone in Embodiment 2.

FIG. 15 illustrates how a pedestrian zone and a mobile body zone are set.

(1) The sidewalk 301 is not congested, and accordingly there is no distinction between a pedestrian zone and a mobile body zone.

(2) The sidewalk 301 starts to be congested.

(3) A virtual passage for the pedestrians 303, a virtual inbound passage for the PMVs 310, and a virtual outbound passage for the PMVs 310 are set.

Figure 14:
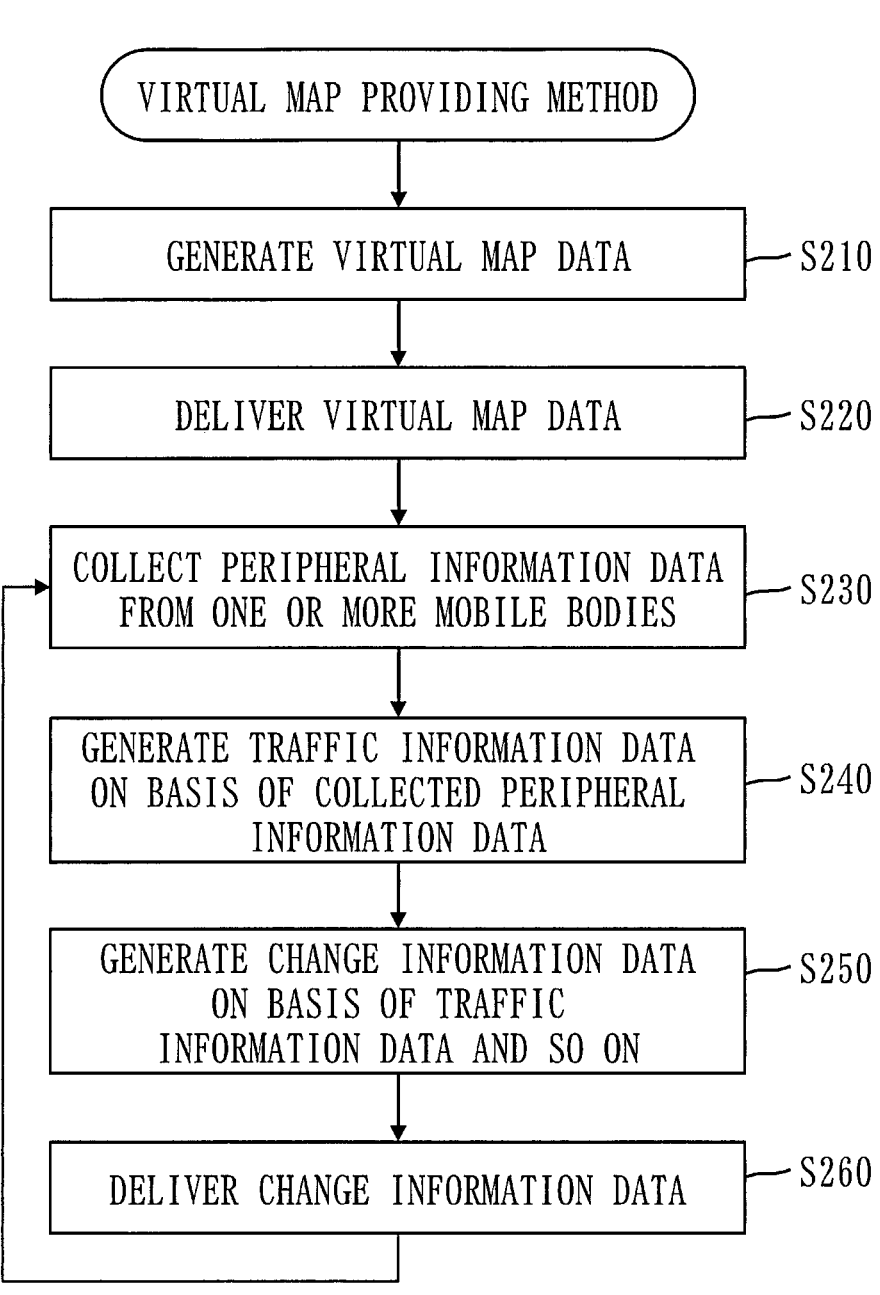
FIG. 14 is a flowchart of a virtual map providing method in Embodiment 2.

Back to FIG. 14, explanation on step S250 will continue.

A zone setting unit 151 dynamically changes the pedestrian zone and the mobile body zone by at least either one of (C1) and (C2).

(C1) The zone setting unit 151 changes a width of the pedestrian zone on a basis of the congestion situation of the pedestrians 303.

For example, when a number of pedestrians 303 (that is, a number of mobile terminals 304) increases and the pedestrian zone starts to be congested, the zone setting unit 151 narrows the mobile body zone and widens the pedestrian zone.

(C2) The zone setting unit 151 changes a width of the mobile body zone on a basis of the congestion situation of the PMVs 310.

For example, when a number of PMVs 310 increases and the mobile body zone starts to be congested, the zone setting unit 151 narrows the pedestrian zone and widens the mobile body zone.

(C3) The zone setting unit 151 changes the pedestrian zone and the mobile body zone depending on a time-frame.

For example, at a regulation time point, the zone setting unit 151 narrows the pedestrian zone and widens the mobile body zone.

For example, at a regulation time point, the zone setting unit 151 narrows the mobile body zone and widens the pedestrian zone.

The zone setting unit 151 changes the pedestrian zone and the mobile body zone by a following procedure.

Before changing part of the mobile body zone into the pedestrian zone, or before changing part of the pedestrian zone into the mobile body zone, the zone setting unit 151 changes a zone of that part into a displacement zone. In the displacement zone, each pedestrian 303 or each PMV 310 is requested to be displaced to another zone.

After changing the zone of that part into the displacement zone, when a displacement end condition is satisfied, the zone setting unit 151 changes the zone of that part into a prohibited zone. In the prohibited zone, each pedestrian 303 and each PMV 310 are prohibited from moving.

For example, the zone setting unit 151 measures a time elapsed since changing the zone of that part into the displacement zone. When the time elapsed reaches a regulation time, the zone setting unit 151 changes the zone of that part into the prohibited zone.

After changing the zone of that part into the prohibited zone, when a prohibition end condition is satisfied, the zone setting unit 151 changes the zone of that part into the pedestrian zone or the mobile body zone.

For example, the zone setting unit 151 measures a time elapsed since changing the zone of that part into the prohibited zone. When the time elapsed reaches a regulation time, the zone setting unit 151 changes the zone of that part into the pedestrian zone or a mobile body zone.

For example, the zone setting unit 151 refers to traffic information of the zone of that part indicated in the traffic information data, and decides whether a pedestrian 303 or a PMV 310 exists in the zone of that part. When no pedestrian 303 or no PMV 310 exists in the zone of that part any longer, the zone setting unit 151 changes the zone of that part into the pedestrian zone or the mobile body zone.

The zone setting unit 151 dynamically changes the inbound zone and the outbound zone with respect to the mobile body zone (or the pedestrian zone). A method of changing is the same as the method of dynamically changing the inbound zone and the outbound zone with respect to the driveway 201 in Embodiment 1.

In step S260, a virtual information delivery unit 160 delivers the change information data to the one or more PMVs 310 and the one or more mobile terminals 304 by using the communication device 104. For example, the virtual information delivery unit 160 transmits the change information data to the base station 302, thereby delivering the change information data from the base station 302 to the one or more PMVs 310 and the one or more mobile terminals 304.

In each PMV 310, the virtual information reception unit 334 receives the change information data by using the communication device 324. Then, the mobile body control unit 335 controls the PMV 310 by utilizing the virtual map data and the change information data.

For example, the mobile body control unit 335 performs autonomous driving by controlling an operation lever or the like.

For example, the mobile body control unit 335 informs the user of virtual information through an image or audio by controlling the display or the loudspeaker.

Each mobile terminal 304 receives the change information data and informs the pedestrian 303 of the change information through an image, audio, or the like.

The pedestrian 303 moves while checking notification from the mobile terminal 304.

Step S330 through step S360 are executed repeatedly.

*Effect of Embodiment 2*

Embodiment 2 enables fully effective use of the sidewalk 301 entirely.

For example, when the number of PMVs 310 is larger than the number of pedestrians 303, the movable body zone can be enlarged by narrowing the pedestrian zone. This leads to fully effective use of the sidewalk 301 entirely.

*Supplemental to Embodiments*

A "driveway" includes a passage, a passageway, or a road surface on which a wheeled mobile body, a vehicle, or the like (including a PMV) can pass.

Embodiment 1 and Embodiment 2 may be combined.

For example, the virtual map providing device 100 may dynamically change the pedestrian zone, the mobile body zone, and the vehicle zone with respect to a road 401 on which a sidewalk 301 and a driveway 201 are not physically separated.

Figure 16:
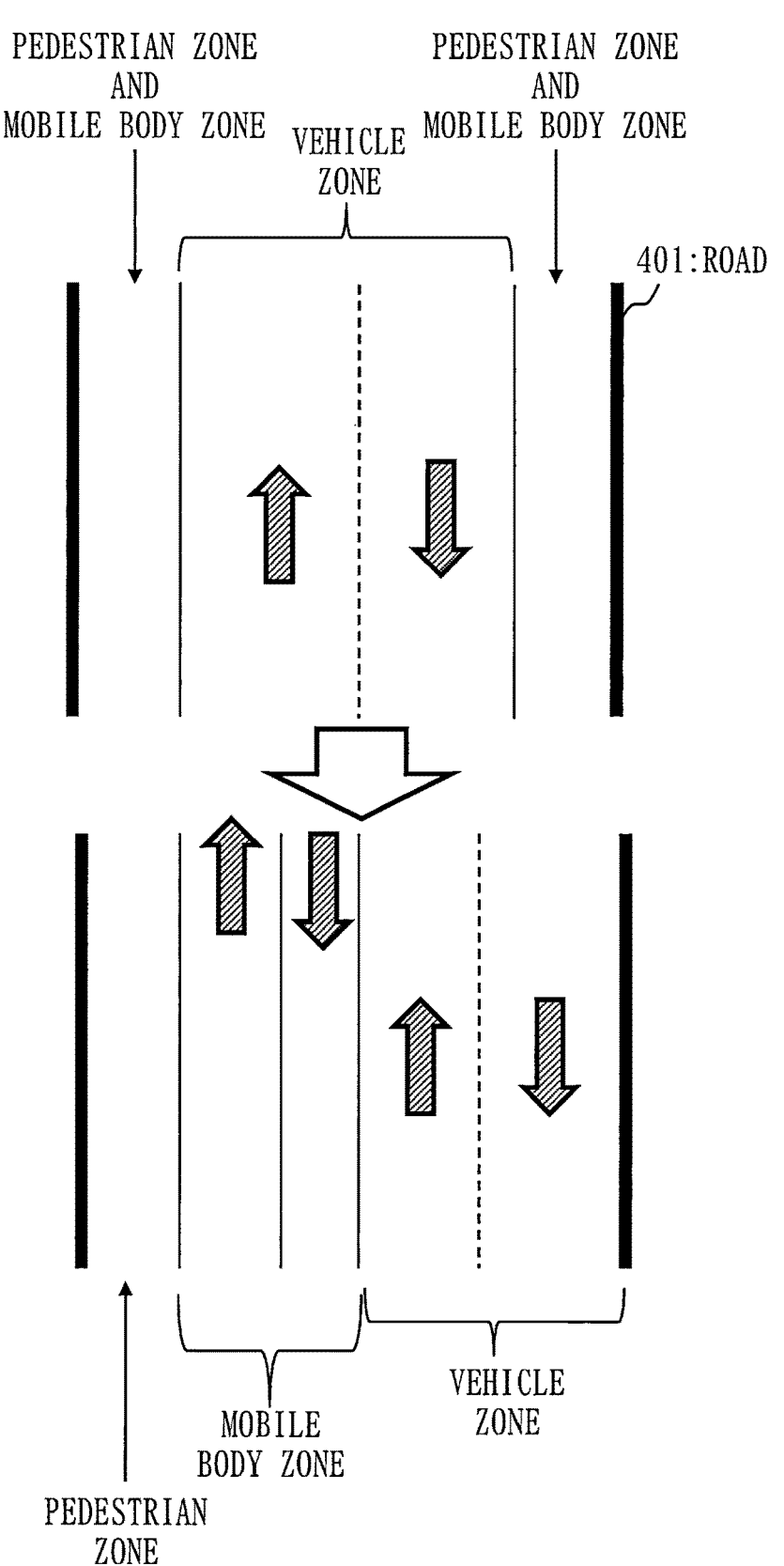
FIG. 16 is a diagram illustrating a pedestrian zone, a mobile body zone, and a vehicle zone in the embodiment.

Referring to FIG. 16, the road 401 is changed from a state in which two zones each serving as a pedestrian zone and a mobile body zone, and a vehicle zone are set, into a state in which a pedestrian zone, a mobile body zone, and a vehicle zone are set.

The virtual map data (including change information data) is received by the vehicle 210 and is used to decide the moving direction of the vehicle 210.

Specifically, a zone of 3 squares in a vertical direction x 3 squares in a horizontal direction (a total of 9 squares) is set to be centered on a zone where the vehicle 210 is located. The vehicle control unit 235 selects, out of the zone of 3 squares in the vertical direction x 3 squares in the horizontal direction, a zone on which the vehicle 210 is to move on a basis of the virtual map data, and moves the vehicle 210 to the selected zone.

Likewise, the virtual map data is received by the PMV 310 and is used to decide the moving direction of the PMV 310.

Figure 17:
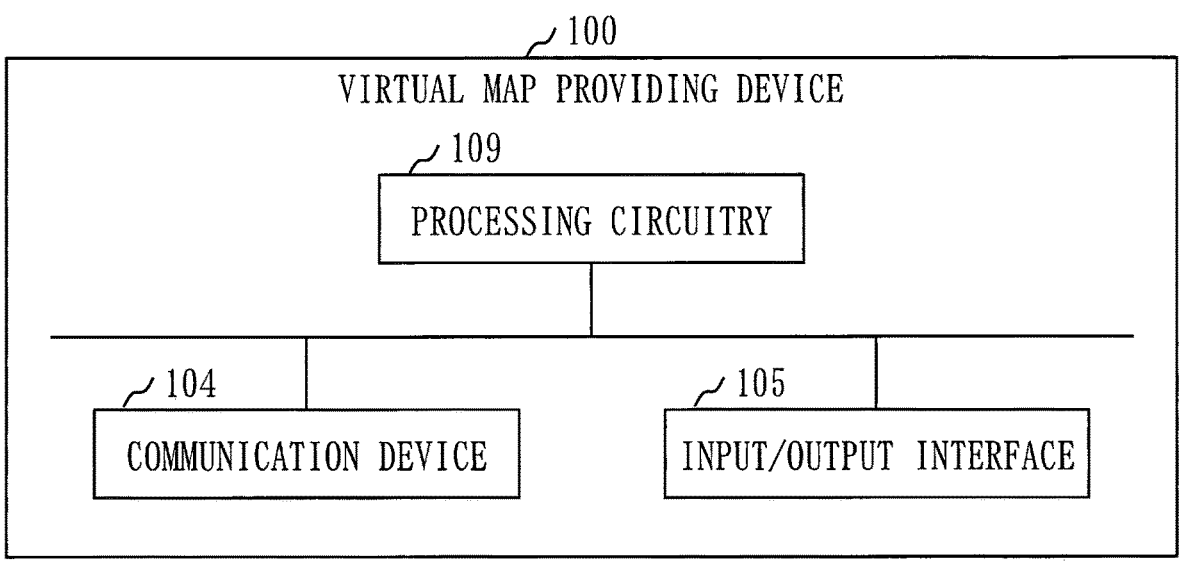
FIG. 17 is a hardware configuration diagram of a virtual map providing device 100 in the embodiment.

A hardware configuration of the virtual map providing device 100 will be described with referring to FIG. 17.

The virtual map providing device 100 is provided with processing circuitry 109.

The processing circuitry 109 is hardware to implement the virtual map generation unit 110, the virtual map delivery unit 120, the peripheral information collection unit 130, the traffic information generation unit 140, the virtual information generation unit 150, and the virtual information delivery unit 160.

The processing circuitry 109 may be dedicated hardware, or may be a processor 101 that runs the program stored in the memory 102.

When the processing circuitry 109 is dedicated hardware, the processing circuitry 109 is, for example, one or a combination of a single circuit, a composite circuit, a programmed processor, a parallel-programmed processor, an ASIC, and an FPGA.

Note that ASIC stands for Application Specific Integrated Circuit.

Note that FPGA stands for Field Programmable Gate Array.

The virtual map providing device 100 may be provided with a plurality of processing circuitries that replace the processing circuitry 109.

In the processing circuitry 109, some of its functions may be implemented by dedicated hardware, and the remaining functions may be implemented by software or hardware.

In this manner, the functions of the virtual map providing device 100 can be implemented by one or a combination of hardware, software, and firmware.

Each embodiment is an exemplification of a preferred mode and is not intended to limit a technical scope of the present disclosure. Each embodiment may be practiced partly, or may be practiced by combination with another embodiment. A procedure described with using a flowchart and the like may be changed appropriately.

A term "unit" signifying an element of the virtual map providing system (200, 300) may be replaced by "process" or "stage".

REFERENCE SIGNS LIST

100: virtual map providing device; 101: processor; 102: memory; 103: auxiliary storage device; 104: communication device; 105: input/output interface; 109: processing circuitry; 110: virtual map generation unit; 120: virtual map delivery unit; 130: peripheral information collection unit; 140: traffic information generation unit; 150: virtual information generation unit; 151: zone setting unit; 152: speed limit setting unit; 153: traffic light setting unit; 154: sign setting unit; 160: virtual information delivery unit; 190: storage unit; 200: virtual map providing system; 201: driveway; 202: roadside machine; 210: vehicle; 211: radio sensor; 212: Lidar; 213: camera; 214: GNSS receiver; 220: vehicle control device; 221: processor; 222: memory; 223: auxiliary storage device; 224: communication device; 225: input/output interface; 231: virtual map reception unit; 232: peripheral information generation unit; 233: peripheral information transmission unit; 234: virtual information reception unit; 235: vehicle control unit; 239: storage unit; 300: virtual map providing system; 301: sidewalk; 302: base station; 303: pedestrian; 304: mobile terminal; 310: PMV; 311: radio sensor; 312: Lidar; 313: camera; 314: GNSS receiver; 320: mobile body control device; 321: processor; 322: memory; 323: auxiliary storage device; 324: communication device; 325: input/output interface; 331: virtual map reception unit; 332: peripheral information generation unit; 333: peripheral information transmission unit;

334: virtual information reception unit; 335: mobile body control unit; 339: storage unit; 401: road.

The invention claimed is:

1. A virtual map providing device comprising processing circuitry:

to deliver virtual map data to one or more mobile bodies and one or more mobile terminals, the virtual map data including a sidewalk having a virtual pedestrian zone on which one or more pedestrians are to move, and a virtual mobile body zone on which the one or more mobile bodies are to move, to generate traffic information data, the traffic information data including a traffic jam situation of the virtual pedestrian zone and the virtual mobile body zone, to dynamically change, based on the traffic jam situation, the virtual pedestrian zone and the virtual mobile body zone, to deliver change information data including information of a post-change virtual pedestrian zone and information of a post-change virtual mobile body zone, to the one or more mobile terminals carried by the one or more pedestrians moving on the sidewalk and the one or more mobile bodies moving on the sidewalk, wherein the change information data is used by a mobile body control unit of each of the one or more mobile bodies to control movement of the respective mobile body on the sidewalk, and based on the traffic jam situation, before changing part of the virtual pedestrian zone into the virtual mobile body zone, or before changing part of the virtual mobile body zone into the virtual pedestrian zone, to change a zone of that part into a virtual prohibited zone where each of the one or more pedestrians and the one or more mobile bodies are prohibited from traveling, and after changing the zone of that part into the virtual prohibited zone, when a prohibition end condition is satisfied, to change the zone of that part into the virtual pedestrian zone or the virtual mobile body zone.

2. The virtual map providing device according to claim 1, wherein the processing circuitry automatically changes a width of the virtual pedestrian zone on a basis of a pedestrian congestion situation of the sidewalk.

3. The virtual map providing device according to claim 2, wherein the processing circuitry automatically changes a width of the virtual pedestrian zone and a width of the mobile body zone depending on a timeframe.

4. The virtual map providing device according to claim 1, wherein the processing circuitry automatically changes a width of the virtual pedestrian zone and a width of the mobile body zone depending on a timeframe.

5. The virtual map providing device according to claim 1, wherein the processing circuitry further narrows the virtual mobile body zone or the virtual pedestrian zone based on a congestion situation of the one or more pedestrians or the one or more mobile bodies.

6. The virtual map providing device according to claim 1, wherein the processing circuitry further dynamically changes the virtual pedestrian zone, the virtual mobile body zone, and a vehicle zone on a road where the sidewalk and a driveway are not physically separated, and the vehicle zone being a zone in which vehicles move.

7. The virtual map providing device according to claim 1, wherein the processing circuitry further changes a speed limit of a virtual inbound zone and a speed limit of a virtual outbound zone based on the based on a congestion situation.

8. A virtual map providing device comprising processing circuitry:

to deliver virtual map data to one or more mobile bodies and one or more mobile terminals, the virtual map data including a sidewalk having a virtual pedestrian zone on which one or more pedestrians are to move, and a virtual mobile body zone on which the one or more mobile bodies are to move, to generate traffic information data, the traffic information data including a traffic jam situation of the virtual pedestrian zone and the virtual mobile body zone, to dynamically change, based on the traffic jam situation, the virtual pedestrian zone and the virtual mobile body zone, to deliver change information data including information of a post-change virtual pedestrian zone and information of a post-change virtual mobile body zone, wherein the change information data is used by a mobile body control unit of each of the one or more mobile bodies to control movement of the respective mobile body on the sidewalk, to dynamically change a virtual inbound zone which is the virtual mobile body zone for a mobile body moving in an inbound direction, and a virtual outbound zone which is the virtual mobile body zone for a mobile body moving in an outbound direction, based on the traffic jam situation, before changing part of the virtual outbound zone into the virtual inbound zone, or before changing part of the virtual inbound zone into the virtual outbound zone, to change a zone of that part into a virtual prohibited zone where each of the one or more pedestrians and the one or more mobile bodies are prohibited from traveling, and after changing the zone of that part into the virtual prohibited zone, when a prohibition end condition is satisfied, to change the zone of that part into the virtual inbound zone or the virtual outbound zone.

9. The virtual map providing device according to claim 8, wherein the processing circuitry, before changing part of the virtual outbound zone into the virtual inbound zone, or before changing part of the virtual inbound zone into the virtual outbound zone, automatically changes a zone of that part into a virtual prohibited zone where each mobile body is prohibited from traveling, and after changing the zone of that part into the virtual prohibited zone, when a prohibition end condition is satisfied, changes the zone of that part into the virtual inbound zone or the virtual outbound zone.

10. The virtual map providing device according to claim 9, wherein the processing circuitry, before changing the zone of that part into the virtual prohibited zone, changes the zone of that part into a virtual displacement zone where displacement to another zone is requested, and after changing the zone of that part into the virtual displacement zone, when a displacement end condition is satisfied, changes the zone of that part into the virtual prohibited zone.

11. A virtual map providing device comprising processing circuitry:

to deliver virtual map data to one or more mobile bodies and one or more mobile terminals, the virtual map data including a sidewalk having a virtual pedestrian zone on which one or more pedestrians are to move, and a virtual mobile body zone on which the one or more mobile bodies are to move, to generate traffic information data, the traffic information data including a traffic jam situation of the virtual pedestrian zone and the virtual mobile body zone, to dynamically change, based on the traffic jam situation, the virtual pedestrian zone and the virtual mobile body zone, to deliver change information data including information of a post-change virtual pedestrian zone and information of a post-change virtual mobile body zone, to the one or more mobile bodies moving on the sidewalk, wherein the change information data is used by a mobile body control unit of each of the one or more mobile bodies to control movement of the respective mobile body on the sidewalk, based on the traffic jam situation, before changing part of the virtual pedestrian zone into the virtual mobile body zone, or before changing part of the virtual mobile body zone into the virtual pedestrian zone, to change a zone of that part into a virtual prohibited zone where each of the one or more pedestrians and the one or more mobile bodies are prohibited from traveling, and after changing the zone of that part into the virtual prohibited zone, when a prohibition end condition is satisfied, to change the zone of that part into the virtual pedestrian zone or the virtual mobile body zone.

12. A virtual map providing device comprising processing circuitry:

to dynamically change, based on a timeframe, with respect to a sidewalk on which both one or more pedestrians and one or more mobile bodies are to move, a virtual pedestrian zone on which the one or more pedestrians are to move, and a virtual mobile body zone on which the one or more mobile bodies are to move, to deliver change information data including information of a post-change virtual pedestrian zone and information of a post-change virtual mobile body zone, to one or more mobile terminals carried by the one or more pedestrians moving on the sidewalk and one or more mobile bodies moving on the sidewalk, wherein the change information data is used by a mobile body control unit of each of the one or more mobile bodies to control movement of the respective mobile body on the sidewalk, and based on the timeframe, before changing part of the virtual pedestrian zone into the virtual mobile body zone, or before changing part of the virtual mobile body zone into the virtual pedestrian zone, to change a zone of that part into a virtual prohibited zone where each of the one or more pedestrians and the one or more mobile bodies are prohibited from traveling, and after changing the zone of that part into the virtual prohibited zone, when a prohibition end condition is satisfied, to change the zone of that part into the virtual pedestrian zone or the virtual mobile body zone.

13. A virtual map providing device comprising processing circuitry:

to dynamically change, based on a timeframe, with respect to a sidewalk on which both one or more pedestrians and one or more mobile bodies are to move, a virtual pedestrian zone on which the one or more pedestrians are to move, and a virtual mobile body zone on which the one or more mobile bodies are to move, to deliver change information data including information of a post-change virtual pedestrian zone and information of a post-change virtual mobile body zone, wherein the change information data is used by a mobile body control unit of each of the one or more mobile bodies to control movement of the respective mobile body on the sidewalk, to dynamically change a virtual inbound zone which is the virtual mobile body zone for a mobile body moving in an inbound direction, and a virtual outbound zone which is the virtual mobile body zone for a mobile body moving in an outbound direction, based on the timeframe, before changing part of the virtual outbound zone into the virtual inbound zone, or before changing part of the virtual inbound zone into the virtual outbound zone, to change a zone of that part into a virtual prohibited zone where each of the one or more pedestrians and the one or more mobile bodies are prohibited from traveling, and after changing the zone of that part into the virtual prohibited zone, when a prohibition end condition is satisfied, to change the zone of that part into the virtual inbound zone or the virtual outbound zone.

* * * * *